United States Patent
Stenfort

(10) Patent No.: US 7,865,652 B2
(45) Date of Patent: *Jan. 4, 2011

(54) POWER CONTROL BY A MULTI-PORT BRIDGE DEVICE

(75) Inventor: Ross John Stenfort, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 64 days.

This patent is subject to a terminal disclaimer.

(21) Appl. No.: 11/754,954

(22) Filed: May 29, 2007

(65) Prior Publication Data

US 2008/0155162 A1  Jun. 26, 2008

Related U.S. Application Data

(63) Continuation-in-part of application No. 11/644,549, filed on Dec. 22, 2006, now Pat. No. 7,761,642.

(51) Int. Cl.
G06F 13/14 (2006.01)
G06F 1/26 (2006.01)

(52) U.S. Cl. ................................ 710/306; 713/300

(58) Field of Classification Search .......... 710/306, 710/313, 315, 5, 52, 62, 74, 310, 311; 713/300
See application file for complete search history.

(56) References Cited

U.S. PATENT DOCUMENTS

| | | | |
|---|---|---|---|
| 5,440,752 A | 8/1995 | Lenz et al. | |
| 6,247,100 B1 | 6/2001 | Drehmel et al. | |
| 6,388,590 B1 | 5/2002 | Ng | |
| 6,434,620 B1 | 8/2002 | Boucher et al. | |
| 6,763,402 B2 | 7/2004 | Talati | |
| 7,154,905 B2 | 12/2006 | Shin et al. | |
| 7,320,093 B2 * | 1/2008 | Yagi .......................... | 714/50 |
| 7,340,616 B2 * | 3/2008 | Rothman et al. ........... | 713/300 |
| 7,360,010 B2 * | 4/2008 | Ghaffari et al. ............ | 710/316 |
| 7,360,017 B2 * | 4/2008 | Higaki et al. .............. | 711/114 |
| 7,526,587 B2 * | 4/2009 | Nemazie et al. ........... | 710/74 |
| 2003/0033465 A1 | 2/2003 | Chien | |

(Continued)

FOREIGN PATENT DOCUMENTS

TW    507896    10/2002

(Continued)

OTHER PUBLICATIONS

Klaus-Peter Deyring, Serial ATA: High Speed Serialized AT Attachment, Serial ATA Workgroup, Jan. 7, 2003, p. 1-35, Santa Cruz, USA, XP002393220.

(Continued)

*Primary Examiner*—Khanh Dang
*Assistant Examiner*—Trisha Vu
(74) *Attorney, Agent, or Firm*—Maryam Imam; IPxLaw Group LLP

(57) ABSTRACT

An embodiment of the present invention includes a communication system configured to conform to SATA and/or SAS standards and causing communication between one or more hosts and a SATA device. A multi-port bridge device is in communication with the one or more hosts through at least one link, the bridge device includes a power control block operative to control power to a SATA device through a power connection, wherein the power control block causes power to be provided to the SATA device even when the at least one link is operational.

15 Claims, 22 Drawing Sheets

U.S. PATENT DOCUMENTS

| | | | |
|---|---|---|---|
| 2003/0131166 A1 | 7/2003 | Utsunomiya et al. | |
| 2006/0004935 A1* | 1/2006 | Seto et al. | 710/62 |
| 2006/0236198 A1* | 10/2006 | Lintz et al. | 714/758 |
| 2007/0079063 A1* | 4/2007 | Mizuno | 711/112 |
| 2008/0104431 A1* | 5/2008 | Shimada | 713/300 |

OTHER PUBLICATIONS

Robert C. Elliot, Working Draft American National Standard: Information Technology Serial Attached SCSI—1.1 (SAS-1.1), Project T10/1601-D; Rev. 9e Jul. 24, 2005, Houston, Texas, USA; Reference No. ISO/IEC 14776-151:200x.

Robert C. Elliot, Working Draft American National Standard: Information Technology Serial Attached SCSI—2 (SAS-2), Project T10/1760-D; Rev. 6 Sep. 22, 2006, Houston, Texas, USA, Reference No. ISO/IEC 14776-152:200x.

Sata IO Board Members: Dell Computer Corporation, Hewlett Packard Corporation, Hitachi Packard Corporation, Hitachi Global Storage Technologies, Inc., Intel Corporation, Maxtor Corporation, Seagate Technology, Vitesse Semiconductor Corporation, Serial ATA International Organization: Serial ATA Revision 2.5, Oct. 27, 2005.

* cited by examiner

POWER CONTROL BY A MULTI-PORT BRIDGE DEVICE

CROSS REFERENCE TO RELATED APPLICATION

This application is a continuation-in-part of my previously-filed U.S. patent application Ser. No. 11/644,549, filed on Dec. 22, 2006 now U.S. Pat. No. 7,761,642, and entitled "Serial Advanced Technology Attachment (SATA) And Serial Attached Small Computer System Interface (SCSI) (SAS) Bridging" (hereinafter referred to as the "SATA Patent Document", the disclosure of which is incorporated herein as though set forth in full.

FIELD OF THE INVENTION

The present invention relates generally to large scale memory systems causing hosts to communicate, in compliance with the Serial Advanced Technology Attachment ATA (SATA)/High Speed Serialized AT Attachment and/or the Serial Attached Small Computer System Interface (SCSI) (SAS) standard, with a device, and in particular to bridging SAS and SATA connections.

BACKGROUND OF THE INVENTION

Overview of SATA Protocol

With the need for large-scale memory systems for various applications in recent decades has come the need to standardize communication with large-scale memory systems in an effort to increase flexibility of use thereof.

SATA is a high-speed serial link replacement for the parallel Advanced Technology Attachment (ATA) attachment of mass storage devices. The serial link employed is a point-to-point high-speed differential link that utilizes gigabit technology and 8b/10b encoding known to those of ordinary skill in the art. The SATA protocol is based on a layered communication model similar to Open Systems Interconnection (OSI) Reference Model. An overview is presented below. For more detail, the reader is referred to the SATA standard or specification, incorporated herein by reference, and provided in the publication entitled "Serial ATA: High Speed Serialized ATA Attachment" or "Serial ATA International Organization: Serial ATA Revisions 2.5, dated Oct. 27, 2005, and the publication entitled "Serial ATA II: Extensions to Serial ATA 1.0", Revision 2.5, dated Oct. 16, 2002, both of which are currently available at Serial ATA work group web site www.serialata.org.

In the SATA protocol, each layer of protocol communicates with its counterpart directly or indirectly. The serial ATA link is defined by a protocol pursuant to a known standard, having four layers of communications, the physical layer for performing communication at a physical level, a link layer, a transport layer and an application layer or sometimes referred thereto as a command layer. A transmitter and a receiver, cannot directly communicate the latter with each other, rather, they must go through the other layers of their system prior to reaching a corresponding layer of the other. For example, for the physical layer of a transmitter to communicate with the transport layer of the receiver, it must first go through the link, transport and application layers of the transmitter and then through the serial ATA link to the application layer of the receiver and finally to the transport layer of the receiver.

The basic unit of communication or exchange is a frame. A frame comprises of a start of frame (SOF) and end of frame (EOF), which are different delimiters in accordance with the SATA and SAS specifications. In SATA, an STP comprises a frame information structure (FIS), a Cyclic Redundancy Checksum (CRC) calculated over the contents of the FIS and an end of frame (EOF) primitive. The serial ATA organization has defined a specification in which the definition of a frame is provided and which is intended to be used throughout this document. Primitives are double word (Dword) entities that are used to control and provide status of the serial line. The serial ATA organization has defined a specification in which the definition of allowed Primitives is provided and which is intended to be used throughout this document FIG. 1 shows an example of a frame 30. The frame, in FIG. 1, starts with an SOF primitive 30a, followed by a first FIS content 30b, followed by a HOLD primitive 30c indicating that the transmitter does not have data available, followed by a second FIS content 30d, followed by a HOLDA primitive 30e sent to acknowledge receipt of HOLD primitive, sent by the receiver, indicating that the receiver buffer is in a 'not ready' condition, followed by a CRC 30f and an EOF primitive 30g.

The frame 30, in FIG. 1, includes two primitives a HOLD and a HOLDA primitive used for flow control. A HOLD primitive indicates inability to send or to receive FIS contents. A HOLDA primitive is sent to acknowledge receipt of a HOLD primitive. For example, when a receiving node detects that its buffer is almost full, it will send a HOLD primitive to a transmitting node, requesting the transmitter node to stop and when the buffer is ready to receive more data, the receiving node will stop sending a HOLD primitive. The transmitting node sends a HOLDA primitive to acknowledge receipt of the HOLD primitive. Until receipt of the HOLDA primitive, the receiving node continues receiving data. In order to prevent a buffer overrun, the SATA protocol requires a maximum delay of 20 Dwords between a node sending the HOLD primitive and receiving a HOLDA primitive.

There are a number of different frame types. For example, to send data via Direct Memory Access (DMA), a frame known as DMA setup FIS is utilized followed by a DMA data FIS. There are generally three types of FIS structures, one for commands, one for setting up a transfer and another for data relating to the transfer. Each frame structure is used for a different purpose. A command type of frame is sent to execute a command, a setup frame is used to prepare for the data transfer phase of the command and a data frame is used to transfer data.

A "SATA drive", as used herein, refers to a media or disk drive conforming to the SATA standard for transferring information from and to the drive. The interface between the drive and the device coupled thereto is defined by the SATA standard. A "SATA port" is a port adhering to the SATA standard. A "SATA drive" is an example of a "SATA device" and a "SATA device" is an example of a "target". A "target" is a device that accepts commands and responds to received commands.

There is a need for a device or apparatus for bridging communication between SATA and SAS devices, such as a SATA host and a SATA device or a SAS host and a SATA device or multiple SAS devices with a SATA device.

Using SAS as a link, three different types of communication protocols may be employed to open a connection. They are Serial ATA Tunneled Protocol (STP), SSP and SMP. STP is used in SATA. STP is used to allow SATA communication methods which are defined in the SATA standard, SSP and SMP are used to allow small computer system interface (SCSI) types of communication which is defined in the SAS standards.

Once an STP connection is 'opened', the SATA protocol is generally followed. Once an SMP connection is 'opened', an SMP protocol is followed. More specifically, a connection is opened and a connection is established, a request frame is sent by an initiator, a response frame is sent by a target and the connection is closed. The foregoing communication technique and further information regarding SAS is found in the SAS standard, a copy of which is located by referring the web site: www.t10.org A request from the initiator includes a function code within which an area is reserved, as a vendor unique area, to be used to further define a function to be performed by, for example, a target.

An "initiator", as used herein, refers to a unit or device that sends commands and is capable of receiving responses to sent commands. A "target", as used herein, refers to a unit or device capable of receiving commands.

Currently, there is no single device for causing communication between two or more SAS ports and a SATA device. Furthermore, there are no end device types, as defined in the SAS standard that report themselves as STP targets, as defined in the SAS standard. SAS ports are ports conforming to the SAS standard. Moreover, the rate of operation of a SATA device is oftentimes slower than perhaps a SAS host and currently, this difference in performance propagates into the system performance. Thus, there is a need to make a difference in the rate of performance of SAS and SATA devices/hosts to be transparent to the system performance so that there are no apparent delays caused by the slower rate.

Yet another problem with current systems is that a SATA drive to which a bridge device is coupled, need be controlled in terms of its power. Currently, one of the ways this is accomplished is by an expander, accessing the drive through the device, to pulse or poll the drive to obtain power information therefrom. However, when doing so, the links between the expander and the device are down. Accordingly, actions to the drive are delayed thereby adversely affecting system performance. Another way this is accomplished is through an SMP connection by the expander through another component, other than the device, that controls power to the drive. The problem with the foregoing approach is its complexity due to the use of a component located externally to the expander and being potentially a different type of device for every system.

In light of the foregoing, the need arises for a high-performance device allowing communication, in form of power control, to a storage device.

SUMMARY OF THE INVENTION

Briefly, an embodiment of the present invention includes a communication system configured to conform to SATA and/or SAS standards and causing communication between one or more hosts and a SATA device. A multi-port bridge device is in communication with the one or more hosts through at least one link, the bridge device includes a power control block operative to control power to a SATA device through a power connection, wherein the power control block causes power to be provided to the SATA device even when the at least one link is operational.

The foregoing and other objects, features and advantages of the present invention will be apparent from the following detailed description of the preferred embodiments which make reference to several figures of the drawing.

IN THE DRAWINGS

FIG. 1 shows prior art SATA protocol communication layers.

FIG. 2 shows, a communication system 10 to include a SAS port 12 and a SAS port 14 shown in communication with a multi-port bridge device 16, which is shown coupled to a SATA port 18, in accordance with another embodiment of the present invention.

FIG. 3 shows a SAS port 40 coupled to a bridge device 42, which is shown coupled to a SATA port 44, in accordance with an alternative embodiment of the present invention.

FIG. 4, in accordance with an embodiment of the present invention, shows a SAS port 46 in communication with a bridge device 48, which is shown in communication with a port 50 that is SATA-type in its behavior but is not a SATA port.

FIG. 5 shows a SATA port 52 in communication with a bridge device 54, which is shown in communication with a SATA port.

FIG. 6 shows a SATA port 58 and a SATA port 60 in communication with a multi-port bridge device 62, which is shown in communication with a SATA port 64.

FIG. 7 shows an alternative embodiment wherein the system 10 includes a similar configuration to that of FIG. 6 except that the multi-port bridge device 70 in FIG. 7 further includes a mux 78 responsive to the ports 58 and 60 and is further coupled to the device 62.

Figure 24:
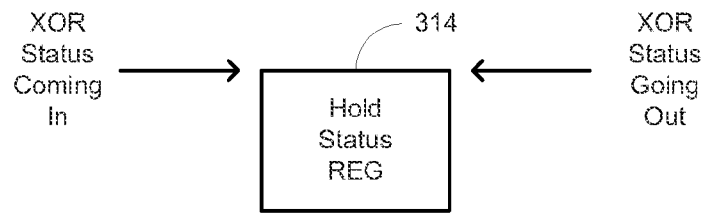

FIG. 24 shows an exemplary holding status register 314 included within each of the status registers 120 and 121.

Figure 25:
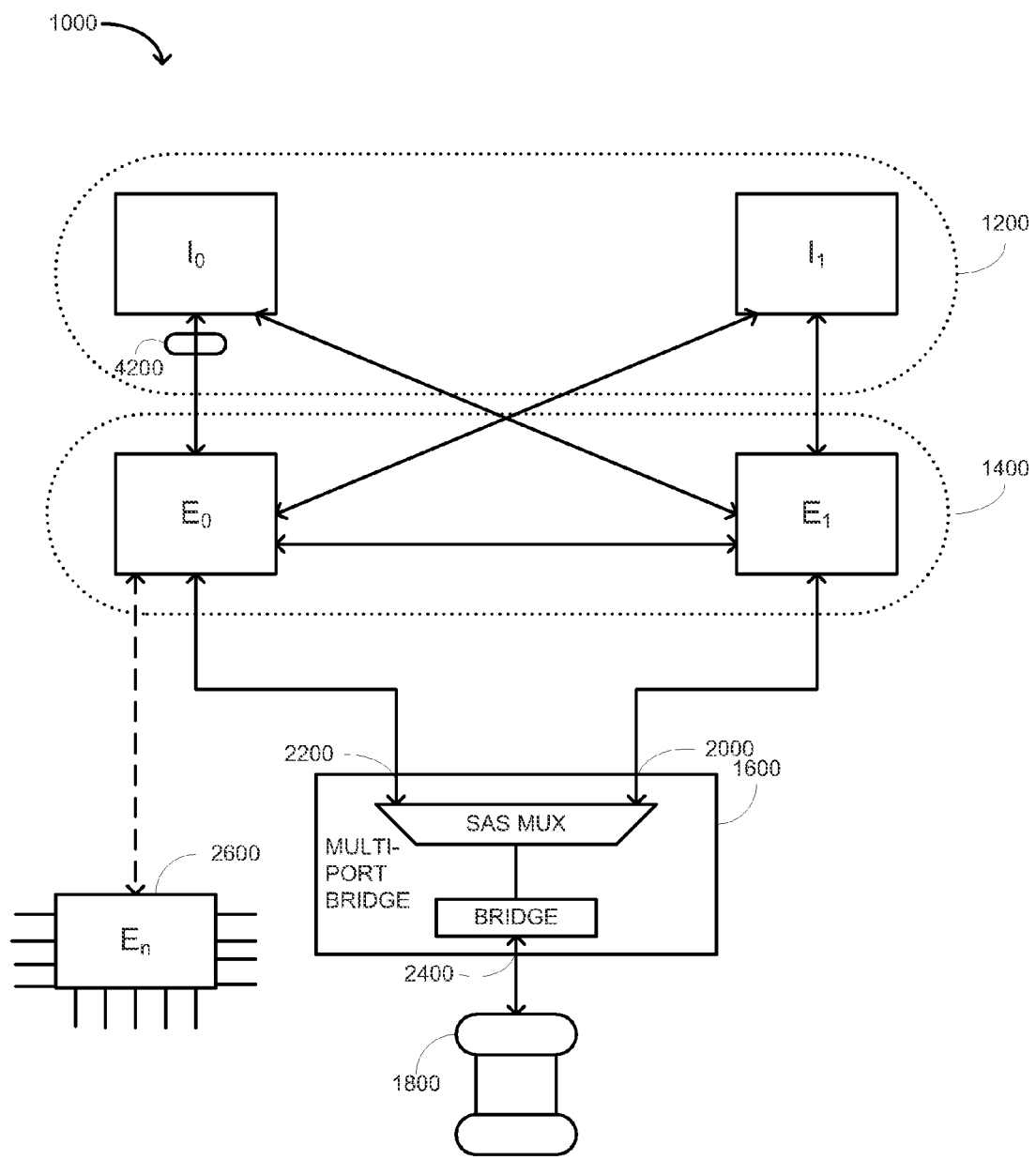

FIG. 25 shows a memory system 1000 to include a group of initiators 1200, I0 and I1, coupled to a group of expanders 1400, E0 and E1, with the group of expanders being in communication with the communication system 1600, in accordance with an embodiment of the present invention.

Figure 26:
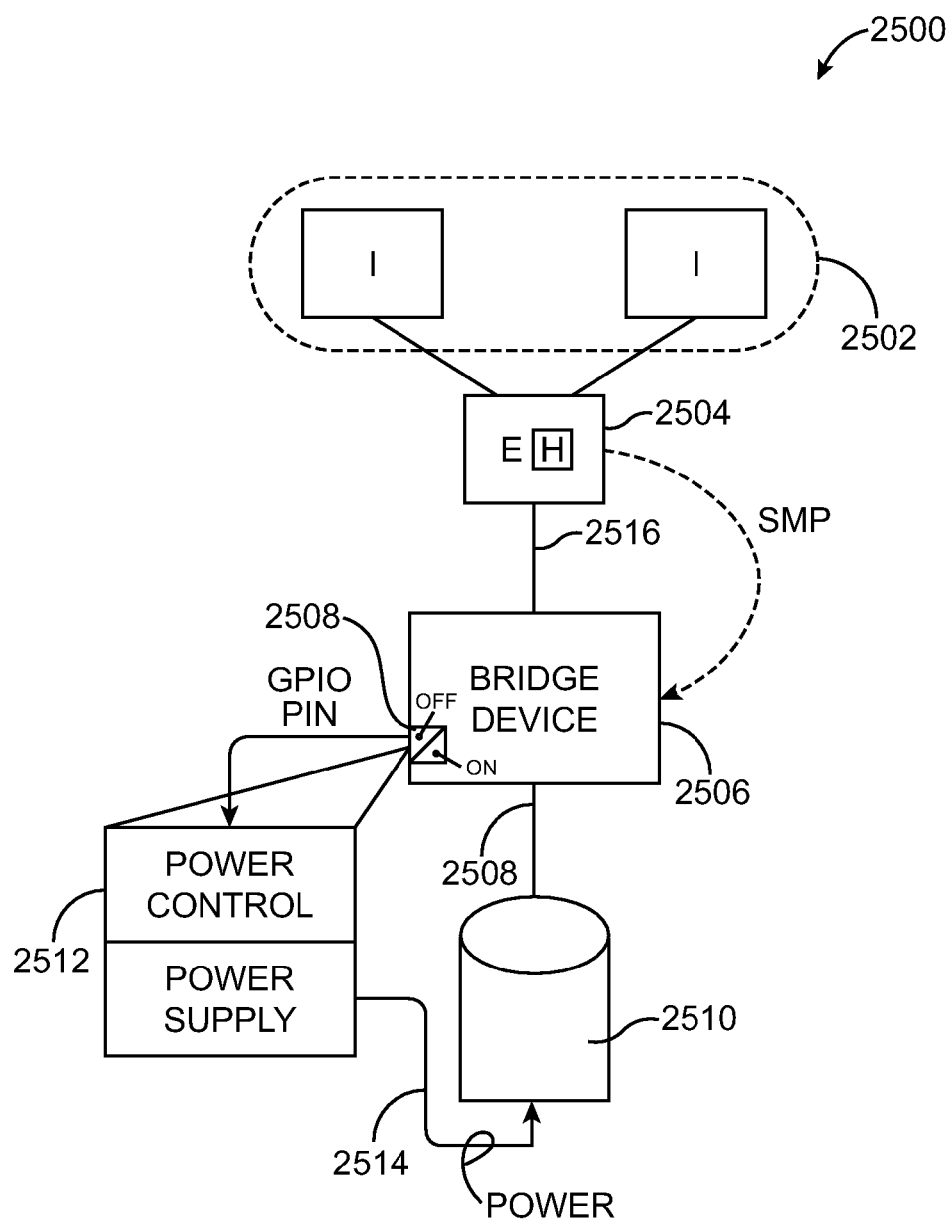

FIG. 26 shows a communication system 2500, in accordance with another embodiment of the present invention.

Figure 27:
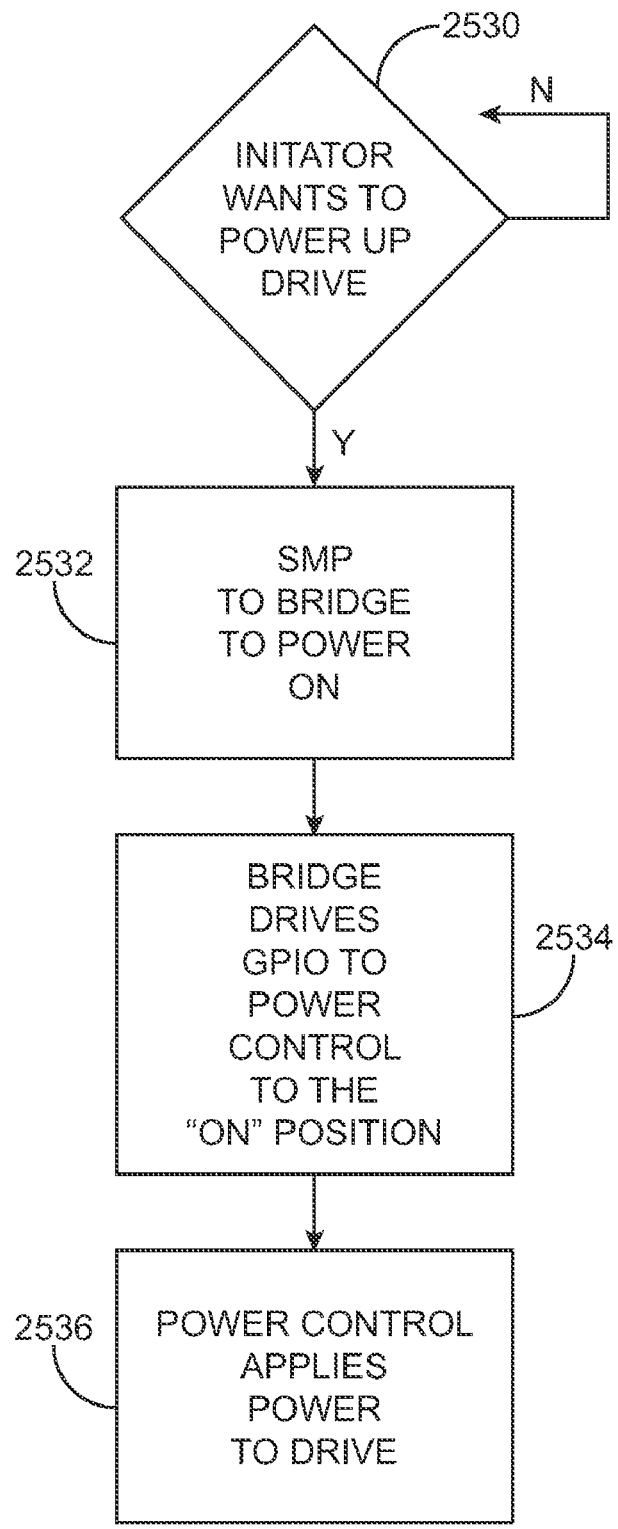

FIG. 27 shows a flow chart of the steps performed, by the device 2506, in controlling power, using, for example, the embodiment of FIG. 26.

DETAILED DESCRIPTION OF THE PREFERRED EMBODIMENTS

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

In an embodiment of the present invention, a communication system configured to conform to SATA and/or SAS standards and causing communication between one or more hosts and a SATA/STP/SMP/SSP device. The communication system, in accordance with one embodiment of the invention includes a multi-port bridge device having a command status manager (CSM) responsive to commands and status from one or more hosts and a data manager (DM) responsive to data from one or more hosts for buffering data substantially separately from that of commands and status.

In large-scale memory systems, such as Redundant Array of Independent Disks (RAID), a multi-port bridge device is used to communicate between one or more initiators and a target. The target may be a disk drive for storing information provided by the initiators and accessed by the initiators. A host and initiator are used to refer to the same device herein. The industry has standardized the serial interface communication interfaces for storage conforming to the SATA and Serial Attached SCSI (SAS) standards, well known in the industry.

A communication bridge is used to allow communication between one or multiple SAS ports or SATA port(s) and a SATA device or SATA type of device. An example of a device is a disk drive or CD-ROM.

Figure 1:
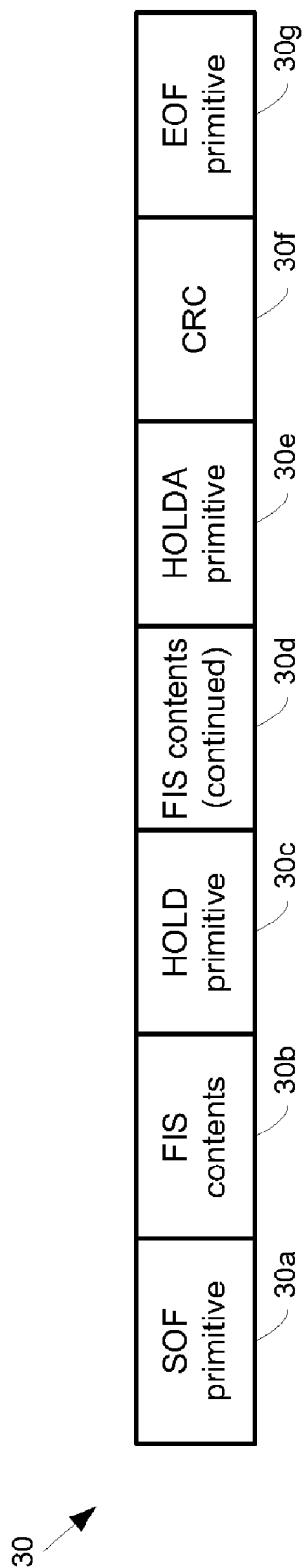
Figure 2:
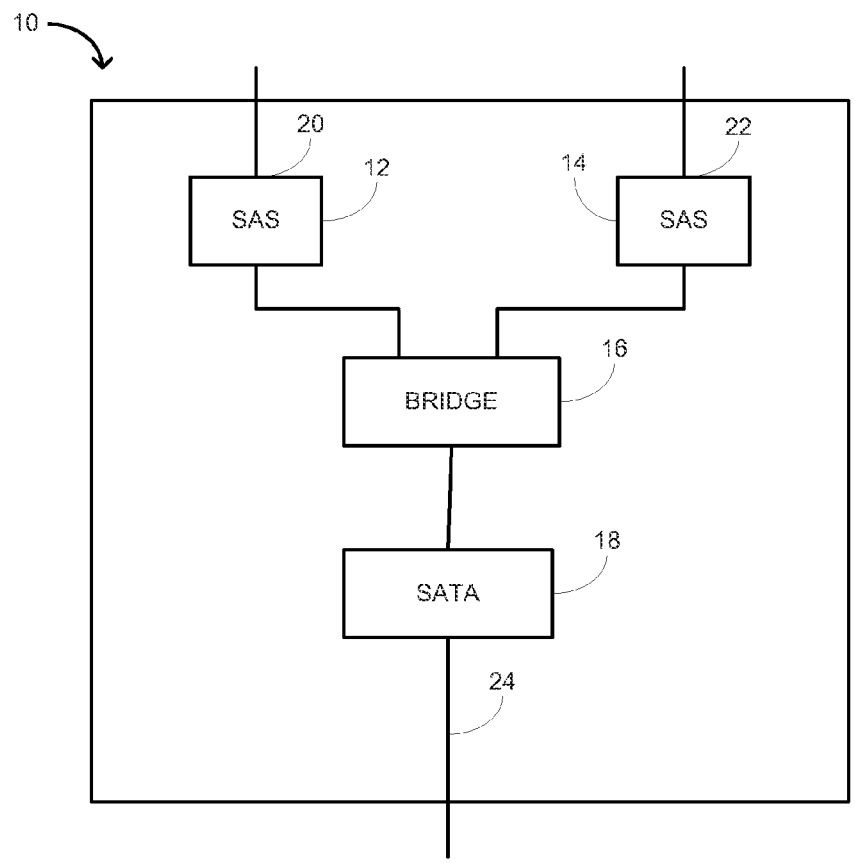

Referring now to FIG. 2, a communication system (or bridge) 10 is shown to include a SAS port 12 and a SAS port 14 shown in communication with a multi-port bridge device 16, which is shown coupled to a SATA port 18, in accordance with another embodiment of the present invention. The ports 12 and 14 comply with the SAS standard and the port 18 complies with the SATA standard in the embodiment of FIG. 2. While not shown in FIG. 2, the port 18 communicates with a SATA device through the connection 24, which may be referred to as a SATA link and the ports 12 and 14 each communicate with a host, through connections 20 and 22, respectively. The connections 20 and 22 may be each referred to as SAS links.

In one embodiment of the present invention, the communication system 10 is a memory or storage device. The SATA device coupled to the port 18 is considered a target and it conforms to the SATA standard. The device 16 converts SAS protocol to SATA or to SATA type of behavior.

Figure 3:
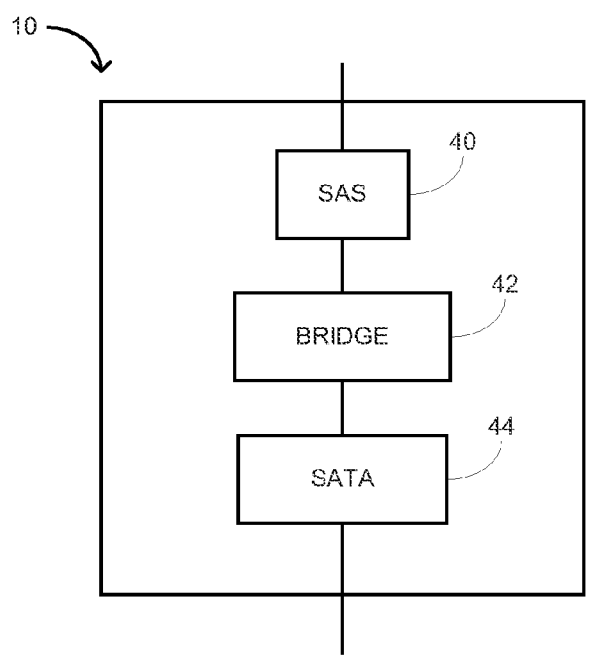

Different configurations or topologies of the system 10 will now be shown with reference to various embodiments of the present invention, although other configurations or topologies are anticipated. In FIG. 3, which is an alternative embodiment, a SAS port 40 is shown coupled to a bridge device 42, which is shown coupled to a SATA port 44.

Figure 4:
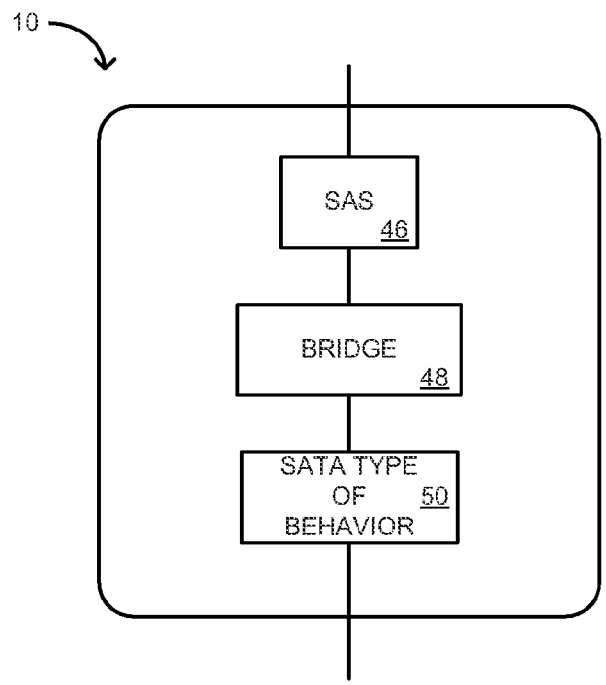
Figure 5:
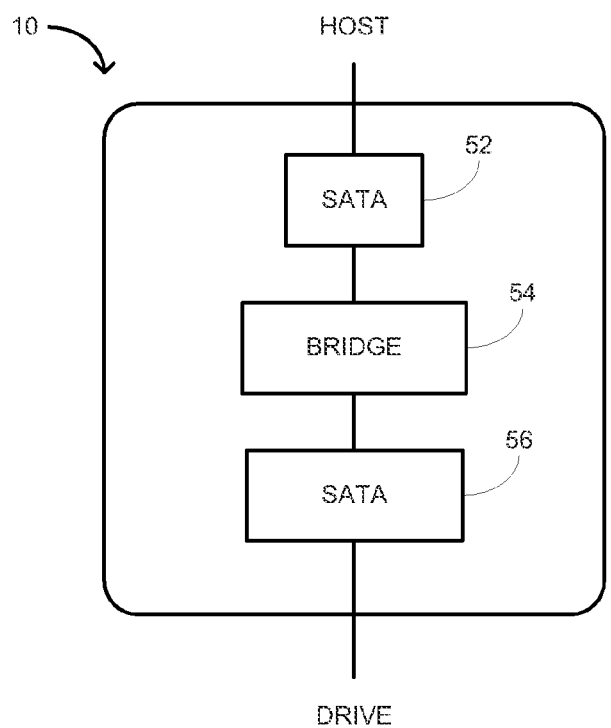
Figure 6:
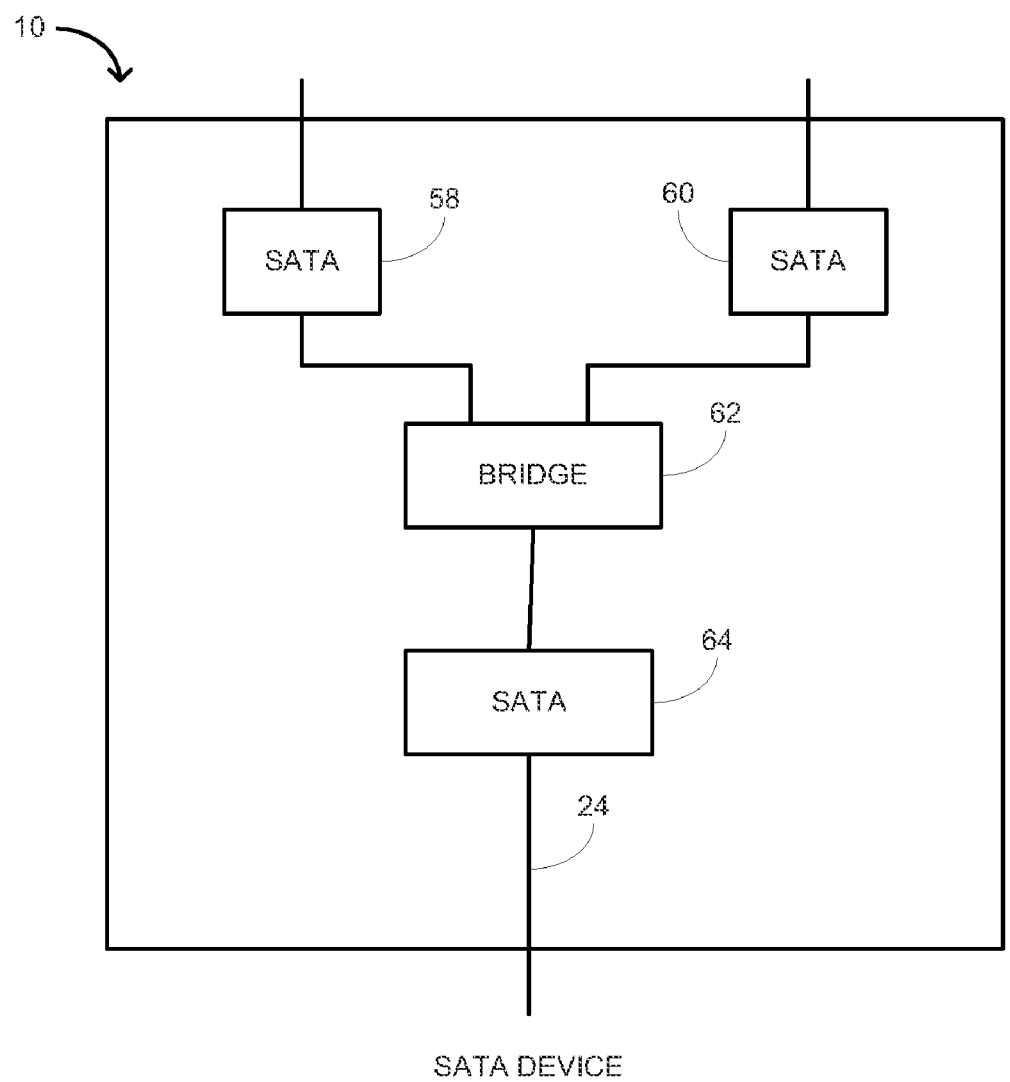

FIG. 4, in accordance with an alternative embodiment of the present invention, shows a SAS port 46 is shown in communication with a bridge device 48, which is shown in communication with a port 50 that is SATA-type in its behavior but is not a SATA port. FIG. 5 shows a SATA port 52 in communication with a bridge device 54, which is shown in communication with a SATA port. FIG. 6 shows a SATA port 58 and a SATA port 60 in communication with a multi-port bridge device 62, which is shown in communication with a SATA port 64. While not shown in the foregoing figures, a host or initiator is in communication with a SAS port. For example, in FIG. 6, a host may be coupled to the port 58 and another host may be coupled to the port 60. The differences between the embodiments of FIGS. 2 and 6 are that in the latter, the output of the port 64 is shown going to a SATA drive and the bridge 62 is shown coupled to two SATA ports 58 and 60, in FIG. 6, rather than SAS ports in FIG. 2.

Where the bridge device in any of the foregoing figures receives input from more than one source, it is multi-ported, such as shown in FIGS. 2 and 6, whereas, if its input is from one source, it need not be multi-ported, such as shown in FIGS. 3, 4 and 5. Furthermore, in embodiments where two SAS or SATA ports are shown to be coupled to the bridge device, a greater number of such ports may be coupled thereto.

Figure 7:
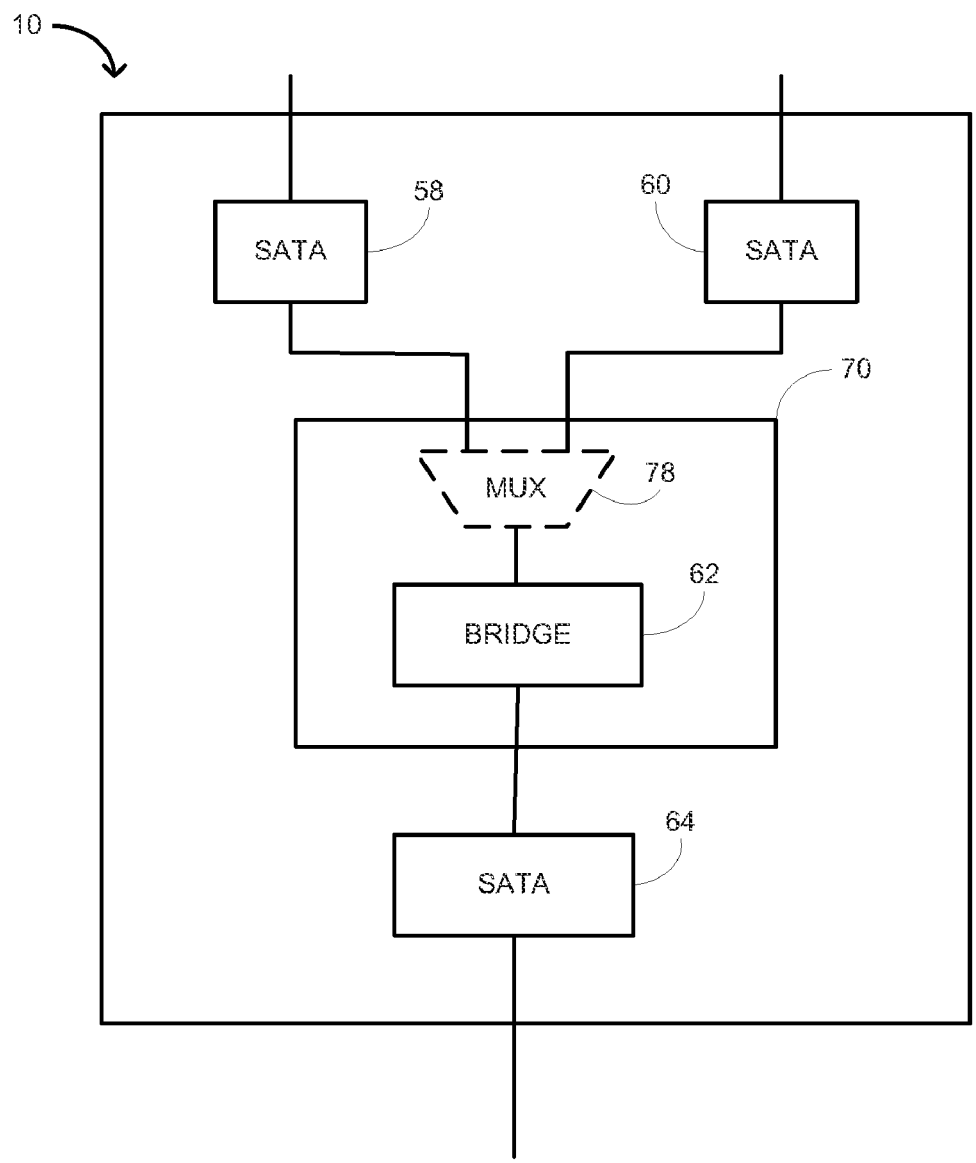

FIG. 7 shows an alternative embodiment wherein the system 10 includes a similar configuration to that of FIG. 6 except that the multi-port bridge device 70 in FIG. 7 further includes a mux 78 responsive to the ports 58 and 60 and is further coupled to the device 62. In the embodiment of FIG. 7, the mux 78 selects between the two ports 58 and 60 but it can be deactivated or unused (or removed) to allow both ports 58 and 60 to be coupled to the bridge 62.

Figure 8:
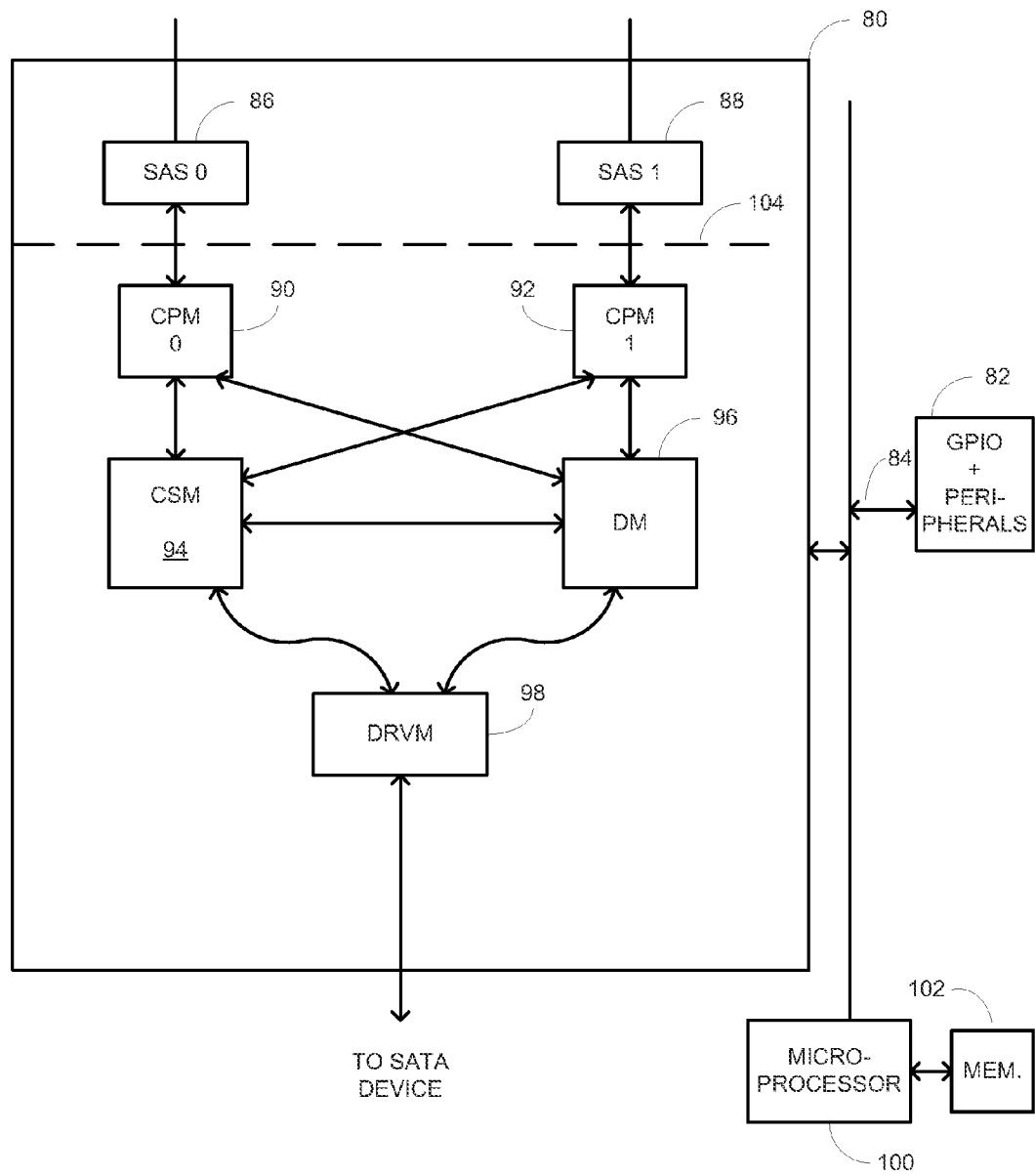
FIG. 8 shows further details of the system 10 of FIG. 2, in accordance with an embodiment of the present invention.

FIG. 8 shows further details of the system 10 of FIG. 2, in accordance with an embodiment of the present invention. In FIG. 8, a SAS-to-SATA conversion device 80 is shown coupled to input/output and peripheral device 82 through a bus 84, in accordance with an embodiment of the present invention. The device 80 may be the bridge devices shown in previous figures, such as the device 70, or the device 62, or the devices 54, 48, 42 or 16.

In one embodiment of the present invention, the device 80 is an end device that is an STP target or SMP target for controlling a SATA device.

The system 10 is further shown to include a microprocessor 100 coupled to the device 82 and the device 80 through the bus 84 and the microprocessor 100 can be any kind of processing unit such as a controller, state-machine or the like and is further shown coupled to the memory 102. The function of the microprocessor 100 is to perform various system functions, such as building frames, directing information traffic and other types of functions performed by a microprocessor The memory 102 is optional and may be replaced by other devices, such as but not limited to a state machine.

The device 80 is shown to include the SAS ports 86 and 88, the connection protocol manager (CPM) 0 90 and the CPM 1 92, the command status manager (CSM) 94, the data manager 96 and the drive manager (DRVM) 98. The port 86 is shown coupled to the CPM 0 90 and the port 88 is shown coupled to the CPM 1 92. The manager 98 communicates to a SATA device, such as a SATA disk drive, although, other types of SATA devices may be employed.

The port 86 is shown coupled to the CPM 0 90, which is shown coupled to the CSM 94 and the DM 96. The port 88 is shown coupled to the CPM 1 92, which is shown coupled to the DM 96 and the CSM 94. The CSM 94 and the DM 96 are shown coupled to each other and the DRVM 98 is shown coupled to the DM 96. The DRVM 98 is shown coupled to the CSM 94.

Below the reference number 104, the SATA protocol is followed, whereas, above the reference number 104, the SAS protocol is followed by the ports 86 and 88. The CPM 0 90 and CPM 1 92 each ensure that the SATA protocol is conformed thereto. The CPM 0 90 and CPM 1 92 also each differentiate between command frames and data frames and control frames and in accordance therewith, transmit the command frames to the CSM 94 and the data frames to the DM 96 for processing. The CSM 94 issues or transmits commands to the DRVM 98, which uses this information to ultimately send a command to a SATA device and when the SATA device (not shown) sends information back, in response to the command(s) from the DRVM 98, the latter transmits or sends the same to the CSM 94. In response thereto the DRVM 98 sends a status to the CSM 94 and the CSM 94 sends the information to one or both of the CPM 0 90 and CPM 1 92. But if the response is of a data or control type, the DRVM 98 sends the information to the DM 96, which transmits the data to one of the CPM 0 90 or CPM 1 92.

The device 82, which is shown coupled to the device 80, is further shown to include general purpose input/output (GPIO) and peripheral devices and the bus 84 communicates to the various blocks of the system 10, as noted earlier. The bus 84 may be referred to as a microprocessor bus. The microprocessor 100 configures the GPIOs so that the rest of the system 10 uses the GPIOs.

The bridge function is performed by blocks located below the reference number 104 up to the DRVM 98. The DRVM 98 serves to follow the SATA protocol and fulfill the requirements of the SATA specification. The system 10 accepts commands from either or both ports 86 and 88 without any muxing or selection process. That is, commands from each of the ports come through and are processed by the rest of the blocks of the system 10. In this manner, SMP is used for communication above the reference number 104 and STP is used for communication below the reference number 104. Furthermore, the CSM 94 receives commands from both ports 86 and 88 and buffers or stores the received commands. In this manner, the system 10 receives commands from two ports without any muxing or selection process.

In the embodiments where only one SAS port is used, either the port 86 or port 88 would not be present, and their respectively coupled CPM 0 or CPM 1 would also not be present. The ports 86 and 88 each include a respective SAS engine (not shown in FIG. 8) for maintaining a configuration table. A table as used herein can be any type of storage location that is capable of being updated. The configuration table including status information for each port and initiators coupled to communicate to the ports is maintained in a respective SAS port. For example, information regarding the status of the port 86 and initiators coupled (or not) to the port 86 is maintained in the SAS engine of the port 86 and is a part of the configuration table. Similarly, the information regarding the status of the port 88 and initiators coupled (or not) to the port 88 is maintained in the SAS engine of the port 88 and is a part of the configuration table. Each SAS link has a configuration table, which is a part of a larger configuration table. The larger configuration table is formed by concatenating the parts of the table from each of the ports 86 and 88. With reference to following figures, further details of relevant blocks of FIG. 8 will now be discussed.

Figure 9:
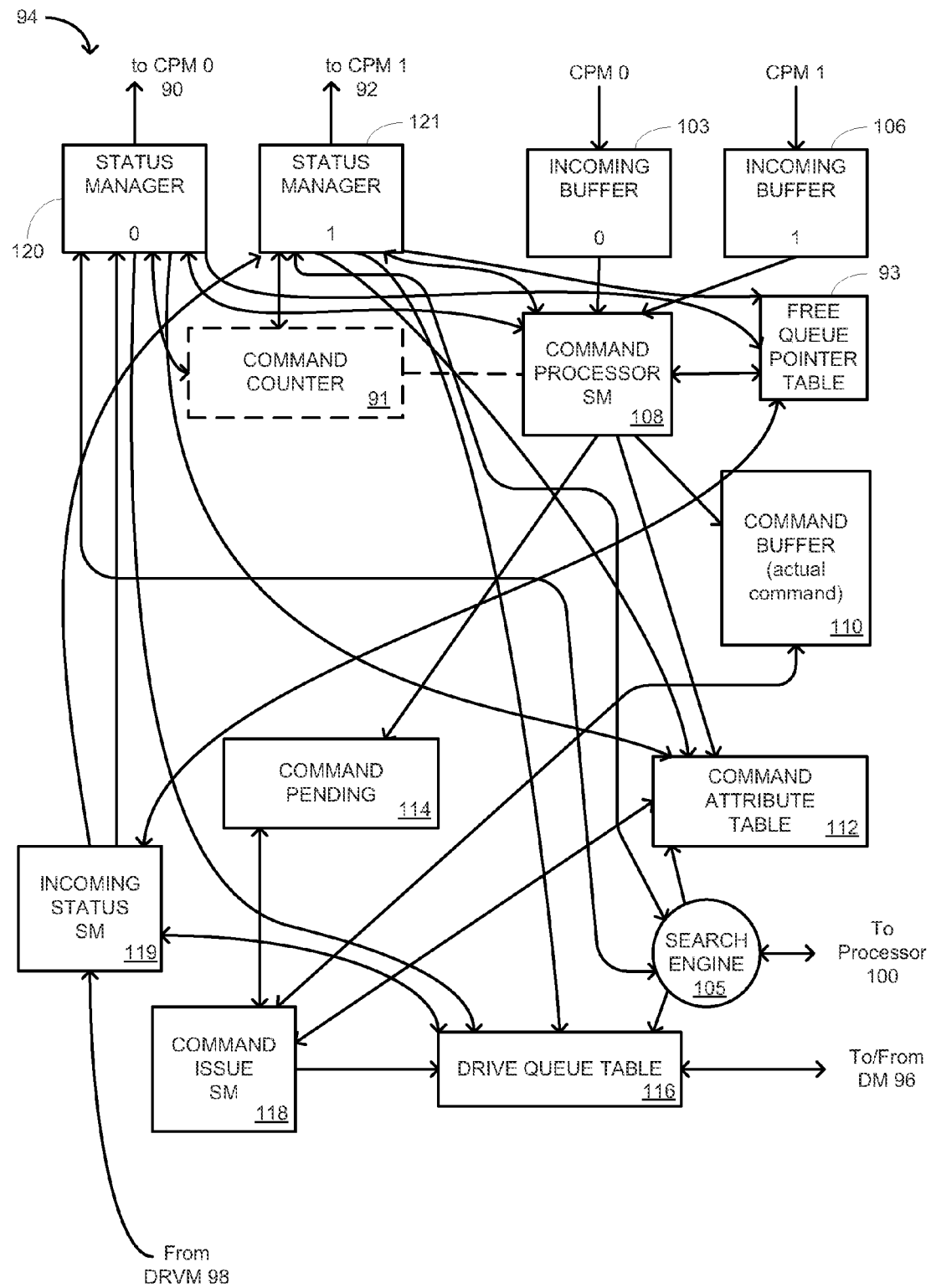
FIG. 9 shows further details of the CSM 94, in accordance with an embodiment of the present invention.

FIG. 9 shows further details of the CSM 94, in accordance with an embodiment of the present invention. In FIG. 9, the CSM 94 is shown to include an incoming buffer 0 103, an incoming buffer 1 106, a command processor state machine 108, a command buffer 110, a status 0 manager 120, a status 1 manager 121, a command pending storage location 114, a command attribute table 112, a drive queue table 116, a command issue state machine 118 and an incoming status state machine 119, in accordance with an embodiment of the present invention.

The buffers 0 103 and 1 106 are shown coupled to the state machine 108, which is shown coupled to the command buffer 110, and further shown coupled to the command attribute table 112 and the command pending storage location 114. The command pending storage location 114 is shown coupled to the state machine 118. The state machine 119 is shown coupled to the table 116 and the table 112 is shown coupled to the state machine 118. The search engine 105 is shown coupled to the status 0 manager 120 and to the status 1 manager 121.

The buffers 0 103 and 1 106 are each responsive to commands from a respective host, through their respective CPMs and are accordingly shown coupled to their respective CPMs. For example, the buffer 0 103 receives commands from the CPM 0 and the buffer 0 106 receives commands from the CPM 1. The buffers 0 103 and 1 106 each pass on the received commands and information related thereto to the state machine 108 for processing thereof.

State machines, as referred to herein, control or cause a process to take place. For example, the state machine 108 causes a command to be processed. The command buffer 110 is shown coupled to the state machine 118.

The storage location 114 is shown coupled to the command issue state machine 118, which is in turn coupled to the DRVM 98. The state machine 118 is shown coupled to the table 116. The status 0 manager 120 and status 1 manager 121 are shown coupled to the state machine 119 and the command attribute table 112 and are further coupled to the CPM 0 90 and the CPM 1 92. The status manager 120 is shown coupled to the state machine 108 as is the status manager 121. The status managers 120 and 121 are also shown coupled to the table 116, which is shown to receive and transmit information from and to the data manager 96.

Further shown in FIG. 9, the CSM 94 includes a command counter 91 coupled to the state machine 108 and a free queue pointer table 93 coupled to the state machine 108 and to the state managers 120 and 121 and to the state machine 119. The counter 91 is further shown coupled to the status managers 0 120 and 1 121. It should be noted that the counter 91 includes as many counters or a method of keeping as many counts as there are initiators or hosts.

Additionally, the CSM 94 is shown to include a search engine 105 coupled to the microprocessor 100 and to the table 112 and to the table 116. The table 93 stores free or available pointers for use by the state machine 108 in storing commands and command attributes in the buffer 110 and table 112, respectively. When a command is done being serviced, the pointer for the serviced command is restored in the table 93 as an available pointer, by the state machine 119. When a command is received, the table 93 is visited to retrieve a free pointer, by the state machine 108, and the pointer is used to store the command and command attribute to the buffer 110 and the table 112, respectively. Similarly, each of the status managers 0 120 and 1 121 can update the table 93.

The command counter 91, which is optional but if used is a counter for each initiator, is a part of a command processor state machine 108, and counts the commands received from an initiator. The count kept by the counter 91 is compared again a predetermined value representing a number of commands allocated to an initiator and if the comparison shows an excess of the number of commands allocated, an error message is reported by the state machine 108 to the status manager from which the command was received. The command count in the counter 91 may optionally be used for various other reasons. Each initiator has a unique predetermined maximum number of commands associated therewith and to this end, each such predetermined number of commands is used by the various counters within the counter 91. In one embodiment of the present invention, the predetermined maximum number of commands associated with the initiator are stored in a configuration table.

The search engine 105, under the direction of the microprocessor 100, has the capability of searching the table 116 and/or the table 112 and can therefore offer valuable information about commands, attributes and the like. Optionally, the search engine 105 is used to search in the status managers 0 120 and 1 121.

The storage location 114 maintains track of commands received from initiators while the table 116 maintains track of the commands that can actually go out or be transmitted to a SATA device. The presence of two such locations provides the flexibility to account for the case where the initiators' commands exceed the number of commands that can be serviced by the SATA device. Thus, commands coming in from initiators are queued in the storage location 114 and commands that are ready to be sent to the SATA device are queued in the table 116. This allows accepting more commands than a SATA device is able to handle and doing so without having to report an error. In this respect, from the initiators' perspective, this situation is of no concern.

The state machine 118 determines whether a command, in the storage location 114 is a queued or non-queued command and depending on the type of command, it will ensure that the command type, i.e. queued vs. non-queued, match that of the pending command in the SATA device. In the case of a non-queued command, the command is not sent to the SATA device until the SATA device no longer has commands pending. In the case of a queued command, the command is sent to the SATA device if the latter can accept queued commands or it has other queued commands pending. In a case where initiators are coupled to the system 10 (of FIG. 7), the state machine 118 allows for multiple initiators can send commands to the same (SAS) port or through the SAS link 86 or 88, even prior to the completion of other initiators commands to the same or different port.

In operation, commands are received by each of the incoming buffers 0 104 and 1 106, in parallel. Next, the received commands are processed by the state machine 108. It should be noted that the commands received by the buffers 0 104 and 1 106 follow the SATA protocol. An available pointer is retrieved from the free queue pointer table 93. The state machine 108 then stores the processed commands in the buffer 110 based on the location of the pointer from the table 93. A pointer pointing to the location in the buffer 110, from the table 93, is used to store the command, i.e. the command pointer, is stored in the storage location 114 by the state machine 108.

The storage location 114 is a queue for storing or queuing pointers to commands as the commands arrive. In this respect, the storage location 114 is a linked list based on a first come, first served basis. Alternatively, a priority list is used to prioritize commands to be served on a priority basis. Yet alternatively, two lists are employed, one list includes a linked list of command pointers and another list, a priority list, includes a list of prioritized commands, which can be serviced out of order based on a higher priority level than other incoming commands. The change in priority of commands being serviced remains transparent to an initiator that is coupled to the system 10.

As a command's pointer makes it to the front of the list of other command pointers in the location 114, the command is stored in the state machine 118, from the buffer 110 and provided to the DRVM 98, which issues the command to the device or the disk drive (or target). The state machine 118 stores command information into the table 116 and sends it to DRVM 98. When the state machine 118 sends a command to the drive (SATA device), it also sends the command information to the table 116.

The target ultimately sends back status to the DRVM 98, which stores the status in the state machine 119. The state machine 119, in turn, provides the status to one or both of the status managers 0 120 or 1 121 and whichever status manager receives the status will then build a frame that includes status received from the DRVM 98. The built frame, which is in conformance with SATA standards, is transmitted to a CPM 0 90 or CPM 1 92 corresponding to the status manager that built the frame. In other words, if the status manager 0 120, built the frame, the frame would be transmitted to the CPM 0 90 and if the status manager 1 92 built the frame, the frame is transmitted to the CPM 1 92. The CPM that receives the frame through the status manager ultimately transmits the frame, through its SAS port or engine, to an initiator (not shown) coupled to the system 10. The path of the status from the DRVM to SAS initialization is referred to as "returning status". As earlier noted, only SATA frames are processed and received by the CSM 94, as all of the SAS protocol is stripped from the frames prior to the frame reaching the CSM 94.

Figure 10:
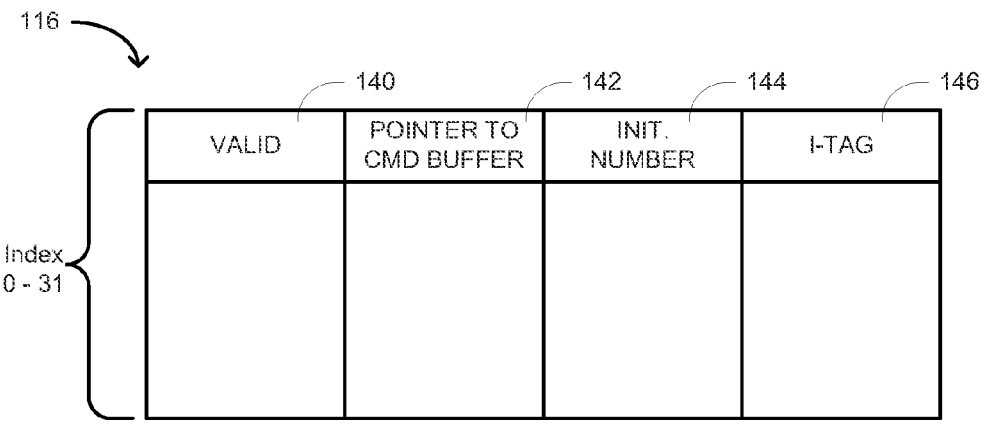
FIG. 10 shows an example of the contents of the table 116.

An example of the contents of the table 116 is shown in FIG. 10. The rows of the table 116 are referred to as Index and there are 32 indexes, labeled Index 0-31. The column of the table 116 includes a 'valid' bit column 140, a pointer-to-command buffer column 142, an initiator number column 144 and an initiator tag column 146. The column 142 stores pointer for associated indexes that each point to a location within the command buffer 110 and to a location within the command attribute table 112. The command attribute table 112 includes attributes regarding a command, i.e. type of command, potential errors associated with the command and others, and it is updated by the state machine 108 when a command arrives. The table 116 is updated by the state machine 118 or the status manager 119 or the status managers 120 or 121.

The pointer is ultimately stored in the table 93 and is available for use for other commands. The column 144 includes the initiator number, associated with an index, from which the command of the indexed row came and the column 140 represents information regarding the validity of the command of an associated row of the table 116. A tag is initially sent by an initiator to the system 10 and it is stored in the command attribute table 112. The stored tag is then re-mapped so as to avoid the situation where initiators have sent the same tag because, for example, two tag 0's cannot be sent to a SATA device or drive. The re-mapping of the tags avoids this situation and is done by the state machine 118. The state machine 118 searches the table 116 for the first entry where a tag is available therein and uses the found entry.

In other embodiments, other than a first entry may be found, such as but not limited to a last entry or a random number entry. That is, the table 116 is used to find the next or first valid index. The state machine 118 looks for the first location in the table 116 that is indicated as not being 'valid' and uses the tag value therein as the new tag. The column 146 then includes the tag that is ultimately used to address a SATA device for each index or row of the table 116.

The rows of the table 116 having a value in an associated column 140 and set to an invalid command, will have a (initiator) tag in the associated column 146 that is free to be used because there are no pending commands for that tag. Mapping of initiator tags to a SATA device or drive and vice versa is done in a non-fixed format or dynamically, in accordance with an embodiment of the present invention. That is, tags are associated with initiators and while in prior art systems, a set of tags is permanently assigned to a given initiator and another set of tags is permanently assigned to another initiator with the relationship of the initiators and tags remaining fixed, in one embodiment of the present invention, the initiator tags are assigned on a dynamic basis. That is, tags are not permanently assigned to initiators, rather, the state machine 118 assigns tags to an initiator, which can be re-assigned to another initiator at a later time. In one embodiment, the command issue state machine 118 dynamically causes assignment of tags from hosts to the SATA device.

The column 142 allows a command to be easily located in the command buffer 110 or in the attribute table 112 so that if an initiator wishes to re-visit a command, this can be easily done using the pointer to the command buffer. The column 144 includes information for determining which or both of the status managers 0 120 and 1 121, the SATA device sends status thereto. Status is provided to two status managers in the case, for example, when the SATA device provides status and status is caused to be provided to two different initiators or when the SATA device responds and the response is caused to be provided to two different initiators.

In the table 116, in whichever index or row there is an associated 'valid' entry that indicates 'NOT SET', the tag associated therewith is available for use. In the example of FIG. 10, since there are 32 indexes, 32 tags can be used. If the table 116 is full, or all 32 indexes have valid commands, no commands can be issued to the SATA device. The number 32 is used merely as an example, thus, other number of indexes may be employed.

Status may be returned to one or more initiators. Thus, the table 116 provides a way of determining whether one or more initiators have returned status and which tags have been assigned to the SATA drive.

Figure 10A:
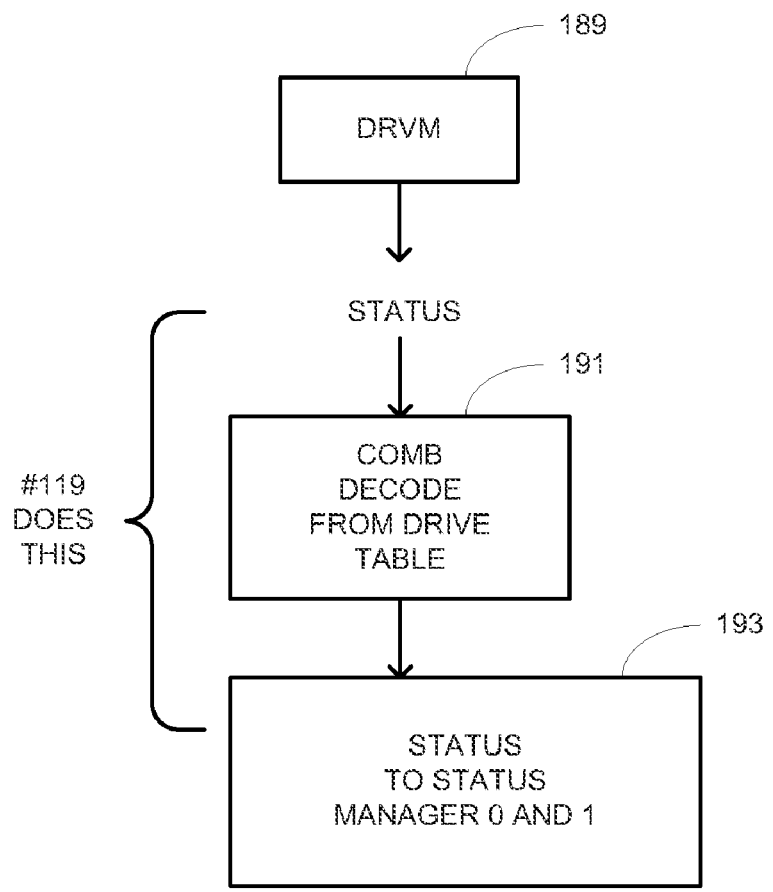
FIG. 10(a) shows a flow chart is shown of relevant steps performed by the state machine 119 for when status is received from a SATA device, in accordance with a method of the present invention.

Some discussion of the way in which information in the table 116 of FIGS. 9 and 10 is mapped will now be presented. In FIG. 10(a), a flow chart is shown of relevant steps performed by the state machine 119 for when status is received from a SATA device, in accordance with a method of the present invention. First, at step 189, the DRVM 98 provides status to the state machine 119. Then, at step 191, the state machine 119 performs a combinatorial decode and then provides the status to the status managers 0 120 and 1 121, at step 193. In step 191, the status from the DRVM 98 is combinatorially compared to the information in the table 116, which results in status to initiators in an efficient and rapid manner. Alternatively, other than combinatorial comparison may be employed.

Figure 11:
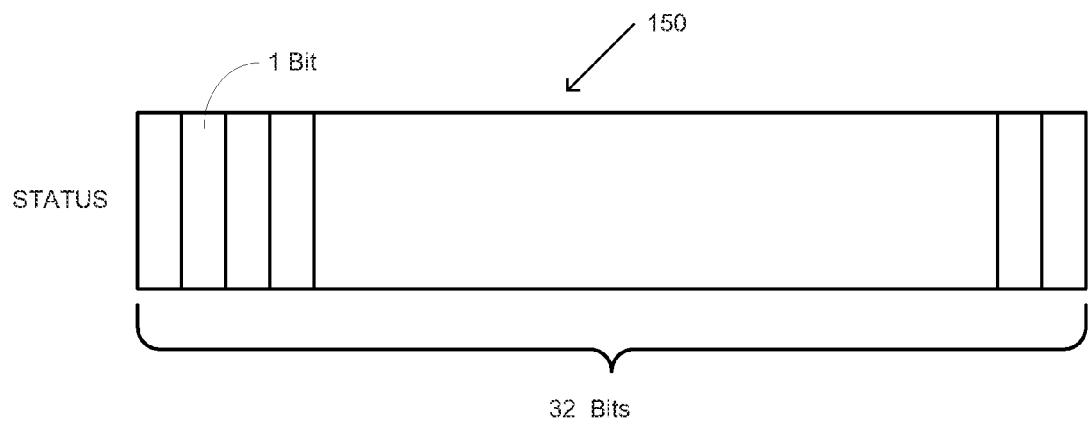
FIG. 11 shows an example of a status 150 received from a SATA device and in the status.

FIG. 11 shows an example of a status 150 received from a SATA device and in the status. In the SATA specification, the status 150 is referred to as a SACTIVE register. There are 32 bits with each bit serving as one of the indexes of the table 116. There is one bit per tag, thus, the number of tags is determined by the width or number of bits of the status 150. Some of the benefit bestowed by the contents of the table 116 will now be further explained relative to FIG. 11 and FIG. 12.

Figure 12:
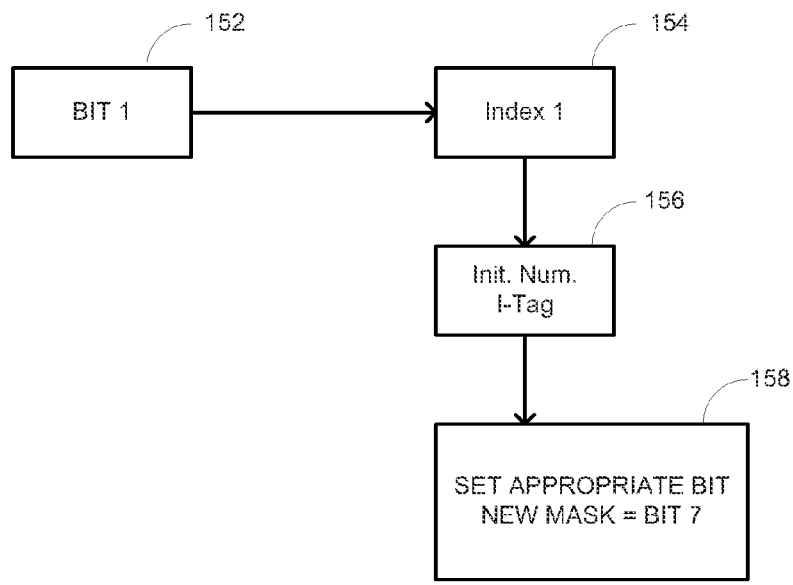
FIG. 12 shows a block diagram of the mapping of FIG. 10(a).

In FIG. 12 shows a block diagram of the mapping of FIG. 10(a). An example of a first tag serves as an index to the table 116 to quickly retrieve information regarding initiators and tags. That is, at step 152, the value of bit one in the status 150 is determined and used to index the row indexed by Index 1 in the table 116, at step 154. Next, at step 156, the initiator number in the column 144 associated with the Index 1 and the I-tag of the column 146 associated with the Index 1 are retrieved from the table 116. Next, an appropriate bit is set for a next bit or index. Use of the table 116 allows the initiator number and I-tag (initiator tag) to be quickly retrieved using either combinatorial logic or memory, which are both well known.

An initiator is prevented from issuing more commands than there are outstanding tags. That is, in the example above, if a thirty third command is issued by an initiator whereas thirty two are outstanding, an error results. For a 'non-queued' command, a determination is made as to whether or not there are more than one non-queued commands for the same initiator and if so, an error. The rules for handling commands, as stated in the foregoing, are verified by the command attribute table 112. 'Queued' commands are specified in the SATA standard, referenced hereinabove.

Figure 13:
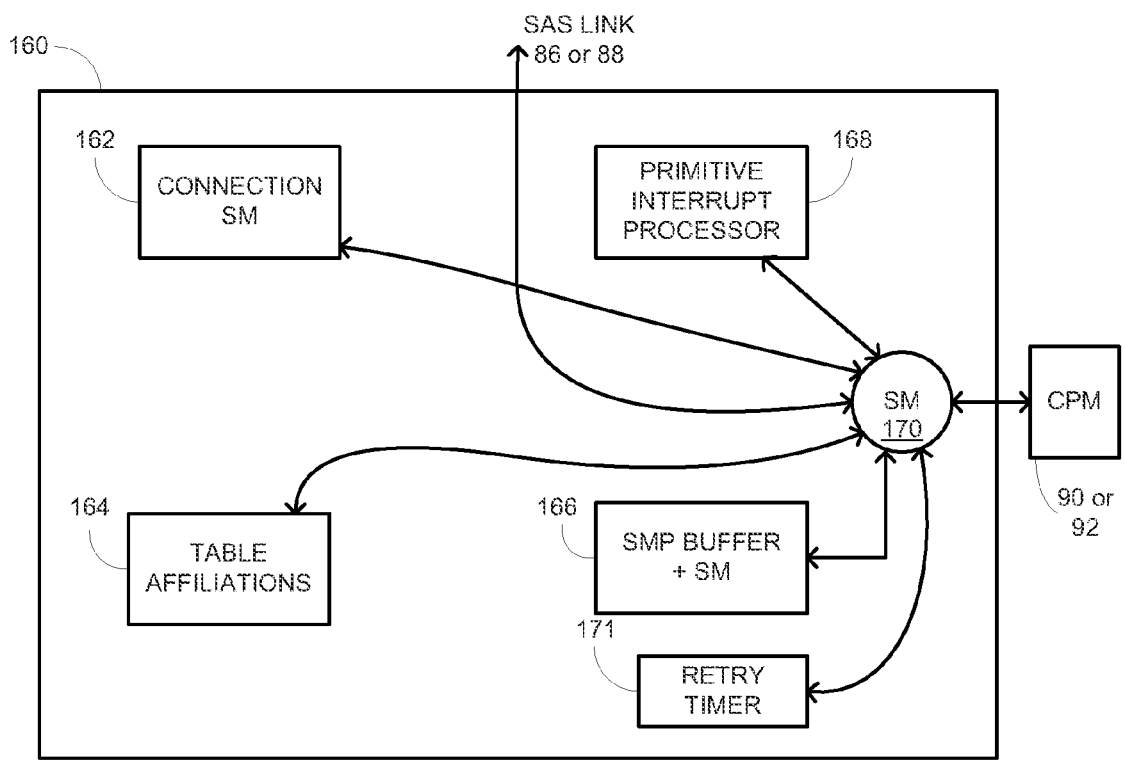
FIG. 13 shows further details of a SAS engine 160 within one of the SAS ports 0 or 1 in FIG. 8.

FIG. 13 shows further details of a SAS engine 160 within one of the SAS ports 0 or 1 in FIG. 8. In FIG. 13, the SAS engine 160 is shown to include a connection state machine 162, a affiliation table 164, a primitive interrupt processor 168, a SMP buffer state machine 166, which are all shown coupled to the state machine 170. The table 164 is a part of a configuration table referred to herein. The engine 160 receives information through the SAS link, which may be links 86 or 88 and is coupled to either the CPM 0 90 or the CPM 1 92. The engine 160, in operation, first builds an open frame, sends the open frame through the SAS link, to an initiator and receives an open-accept primitive from the initiator and establishes a connection to the initiator. The CPM requests to connect to an initiator and then the state machines 162 and 166 perform the steps need to connect the SAS bus (or link) to the requested initiator.

Once a connection is established and data is transferred, the connection is closed. Due to the architecture of the system 10, the connection can be programmed to be closed immediately, or closed after a predetermined time period, or using the frame type to close. Examples of the latter include using a connection even if it is kept open by detecting when frames have been transferred or by the status of a frame. Another example is by knowing the type of frame, the amount of time that a connection needs to be used is known and therefore, a timer can be used to keep track of a predetermined time period based on the detected frame type and when the timer has reached the predetermined time period, the connection can be closed. Due to the buffering of data/status/control, waiting to receive information from the drive is avoided. That is, a connection is opened, frame(s) of data are buffered and then the connection can be closed and the data sent to the SATA device thereafter because the frame has been buffered or stored and there is no need to waiting for the close of a connection, which contributes to increasing the performance of the system. This is further important in disallowing any delays associated with the SATA device to propagate through the system. Furthermore, commands can be received in real-time from initiators without being limited to the capability of the SATA device.

In the case where an initiator is sending data to a SATA device, the data is buffered when received by the system 10 and then sent to the SATA device thereby avoiding delays associated with the SATA device accepting the data. This contributes to increased system efficiency and performance.

Initiators open SMP connections and perform SMP functions. Information coming and going with respect to the engine 160 is stored in the SMP buffer and state machine 166. The microprocessor 100 builds the frame that is to go to the initiator and stores it in the SMP buffer and state machine 166 to be ultimately transmitted to the initiators. In this manner, the initiator can perform control functions independent of SATA activity, which contributes to increased system performance.

Figure 14:
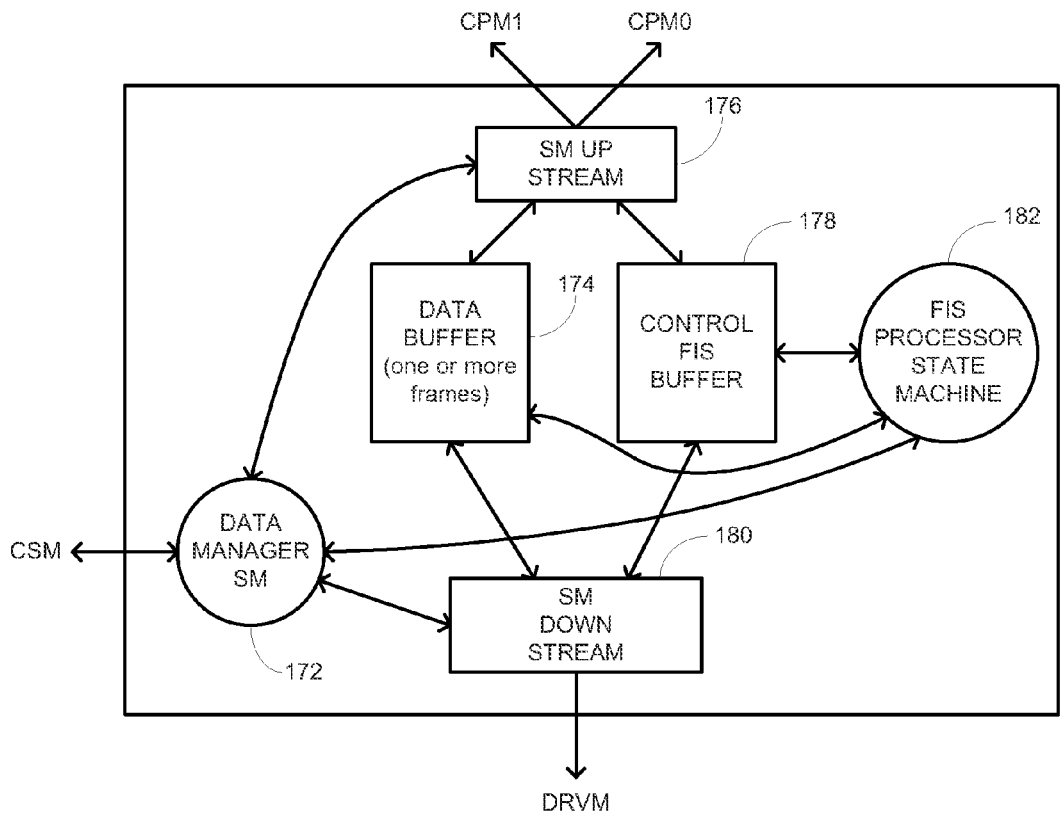
FIG. 14 shows further details of the data manager 96, in accordance with an embodiment of the present invention.

FIG. 14 shows further details of the data manager 96, in accordance with an embodiment of the present invention. The data manager 96 is shown to include an up stream state machine 176, a data buffer 174, a control FIS buffer 178, a FIS processor state machine 182, a data manager control state machine 172 and a down stream state machine 180, in accordance with an embodiment of the present invention. The state machine 180 is shown coupled to the DRVM 98 and the state machine 176 is shown coupled to the CPM 0 and CPM 1. The state machine 172 is shown coupled to the CSM 94. The state machine 176 is further shown coupled to the state machine 172 and to the buffer 178 and to the data buffer 174.

The state machine 182 is shown coupled to the buffer 178, which is in turn shown coupled to the state machine 180. The data buffer 174 stores one or more frames. In FIG. 14, the control FIS is buffered by the buffer 178. Flow of information is either from the state machine 176 to the state machine 180 or vice versa. In one embodiment of the state machines 172 and 182 may be physically the same state machine.

In operation, when a control FIS is received from a SATA device, it is buffered or stored in the buffer 178. When a control FIS is received, the state machine 182 modifies the received control FIS and notifies the state machine 172, which further modifies the modified control FIS and notifies the state machine 176 to send data out of the buffer 178.

When sending information down from the state machine 176, the state machine 176 provides the information to the state machine 172, which informs the state machine 180 to send the information and upon completion of the transfer, the state machine 172 informs the state machine 180 to remove the FIS from the buffer 174.

Regarding data, when it comes in, under the direction of the state machine 182, the data is buffered or stored in the data buffer 174 and later sent to the state machine 180. When the data is ready to be sent to an initiator for the SATA device, the state machine retrieves the data from the buffer 174 and notifies the state machine 172, which then notifies the state machine 176 and the data is sent. When data comes from the SATA device going to an initiator, under the direction of the state machine 182, the state machine 172 is notified and the data is stored in the buffer 174 and the state machine 172 informs the state machine 176 and the data, which was provided through the state machine 180 is transmitted to an initiator. The order of data frames going out of the system 10 is the same order in which it comes in.

Due to buffering a whole frame, if there are delays associated with the SATA links, the SAS link is not tied up, which is in large part due to the buffering of the various embodiments of the present invention. Furthermore, a different data rate between a SAS and SATA links is achieved and will become transparent to initiators due to the frame buffering and also allows for an efficient method of closing connections. As an example, if the SAS link transfers information at a rate of 6 Giga bits per second while the SATA drive is able to receive information at only a rate of 3 Giga bits per second, due to the buffering of the various embodiments of the present invention, no delay is experienced by the initiators while in prior art techniques, delays are experienced. The system 10 of the embodiments of the present invention essentially absorbs any such delay.

Buffering status, command, control and data by the system 10, as done by the embodiments of the present invention, allows system improvement by freeing up a SAS link to allow another initiator to use it. By buffering an entire frame, as done in the data manager, delays associated with the SATA device remain transparent.

Figure 15:
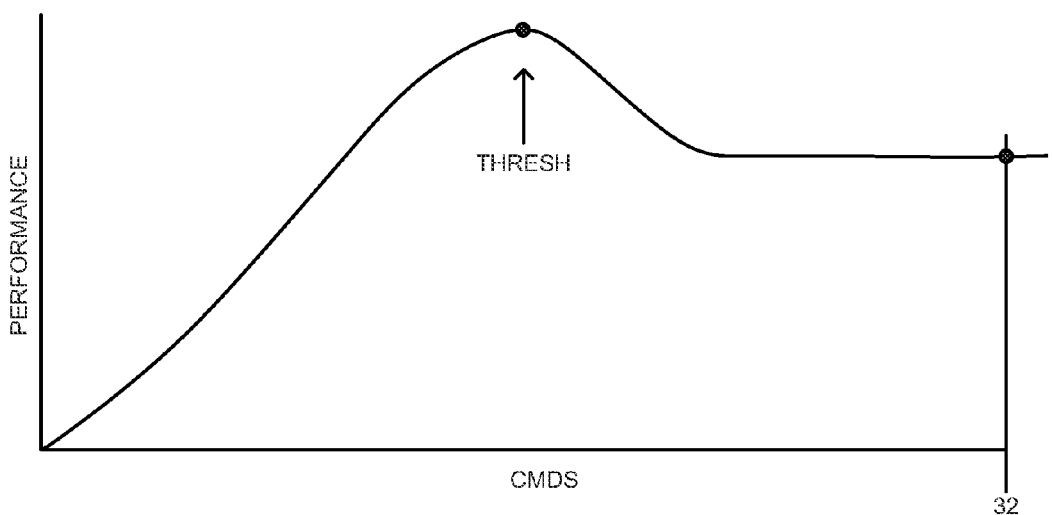
FIG. 15 shows a graph of the performance of the SATA device with respect to the number of commands.

FIG. 15 shows a graph of the performance of the SATA device with respect to the number of commands. That is, on the x-axis, there is shown the number of commands and on the y-axis is shown the performance of the system. The peak performance of the system occurs prior to thirty two commands and actually diminishes thereafter and near the thirty-two command point, the performance remains constant. The peak performance number of commands is calculated and stored in the state machine 118. The state machine 118 searches, within the table 116, for only the peak performance number of commands minus one and in this manner shortens the time associated with a search of the commands. Reducing the number of commands sent to the SATA device also increases system performance by increasing the performance of the SATA device as seen in the graph of FIG. 15.

Figure 16:
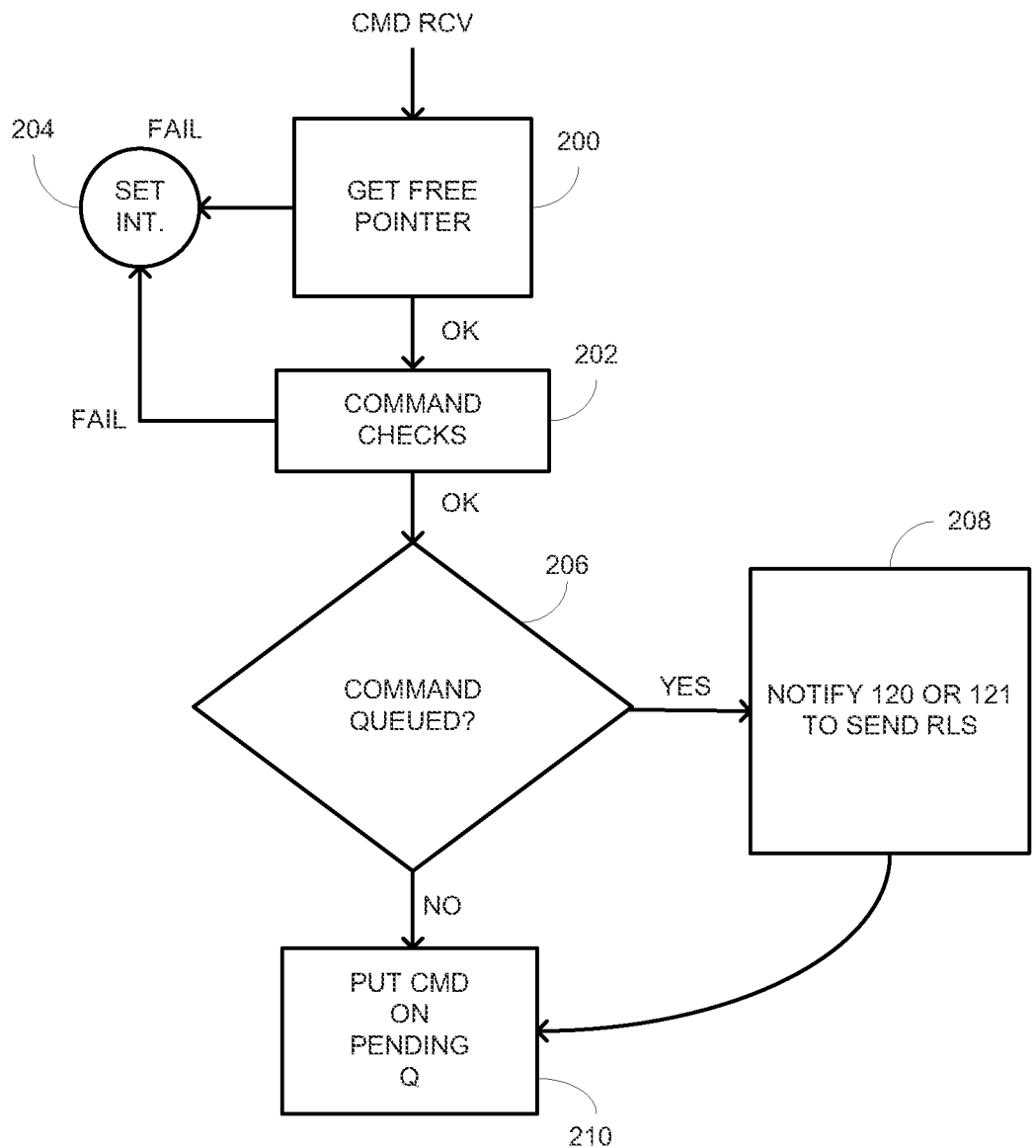
FIG. 16 shows a flow chart of the steps performed, by the CSM 94, when a command is received from a host.

FIG. 16 shows a flow chart of the steps performed, by the CSM 94, when a command is received from a host. First, at step 200, a free or available pointer is retrieved from the free queue pointer table 93. If a pointer is available, the process proceeds to step 202, however, if no free pointer is available, there is a failure, at 204, and an error condition is noted.

At step 202, the received command itself is checked to determine if it is a valid or understood command and if so, the process continues to 206 and if not, the process continues to 204. At 206, a determination is made as to whether or not the command is queued and if so, the process goes to step 208, otherwise, the process continues to step 210. At step 210, the received command is stored in the command buffer 110 and the received command's attributes, such as the initiator number, queued or non-queued command status, and other associated attributes are stored in the table 112. In other embodiments, command attributes may be other information regarding the command.

At step 208, the status manager 120 or 121 is notified to send a release, which when done, effectively releases or frees the link to which the status manager, through the CPM, is coupled and was receiving the command. Next, at step 210, the received command is placed or stored in the location 114.

Figure 17:
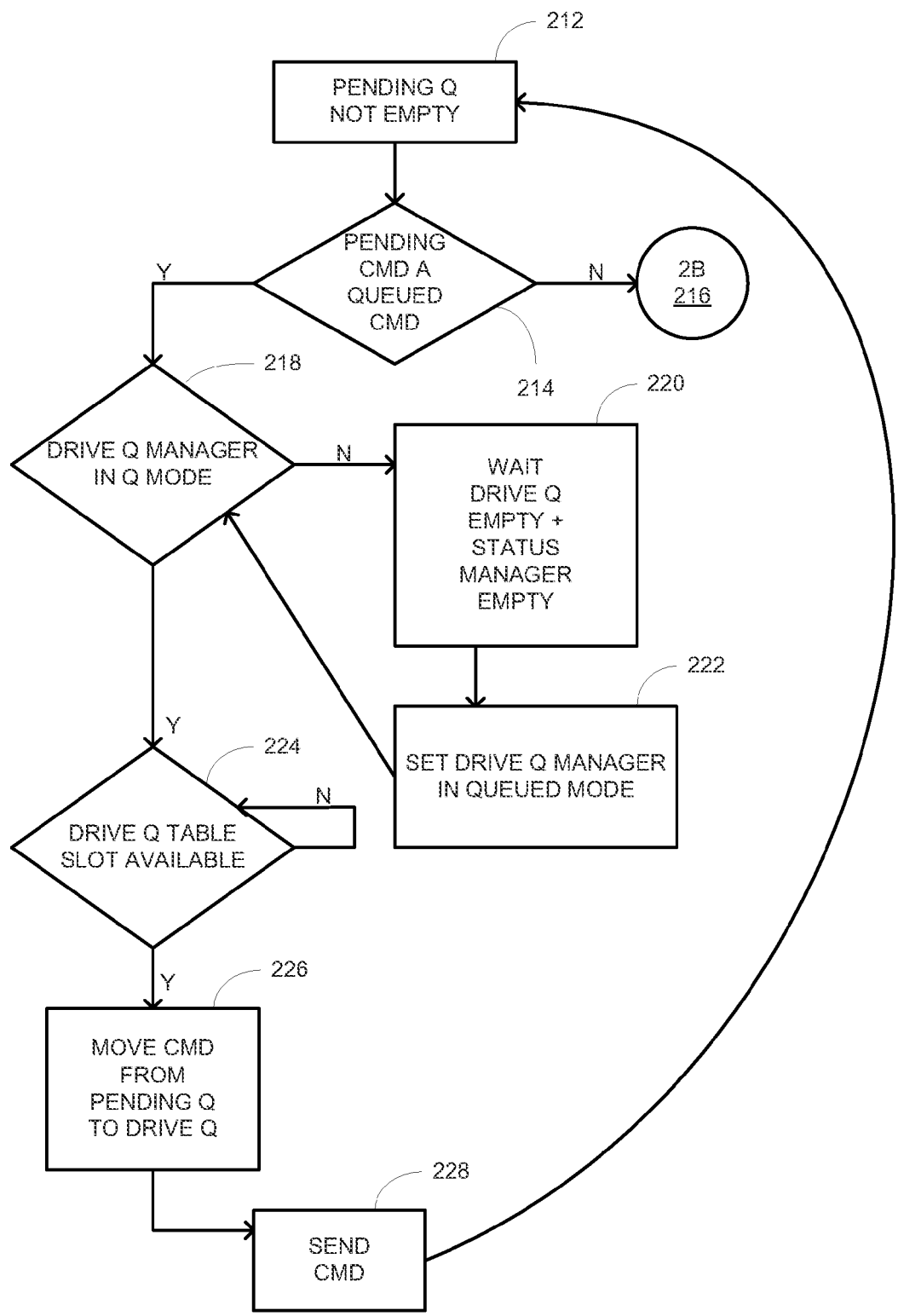
FIG. 17 shows relevant steps performed by the state machine 118 of the CSM 94 (of FIG. 9).

FIG. 17 shows relevant steps performed by the state machine 118 of the CSM 94 (of FIG. 9). At 212, there are pending commands in the location 114 that have not yet been sent to the drive and are therefore in a queue (in the location 114) waiting to be served. Next, at 214, there is a determination made as to whether or not the current (or pending) command (or command next in line to be served) is a 'queued' command or not. If the command is determined to be a queued command, the process proceeds to 218 and if not, the process continues to 216.

At 218, the state machine 118 determines if the SATA device is in queue mode and if so, the process continues to 224 and if not, the process continues to the step 220. A status bit in the state machine 118 is indicative of the queue/non-queue mode. Queue mode is the same as having queued command and non-queue mode is the same as having non-queued command. Queue mode allows more than one command to be sent to a SATA device, while non-queue mode only allows one command to be sent thereto. The SATA standard defines queue mode and non-queue mode.

At the step 220, time is spent waiting for the table 116 to become empty, i.e. come out of queue mode and, similarly time is spent waiting for the status manager 118 to be emptied and when this happens, the step 222 is performed where the status in the state machine 118 is set to queue mode and the process proceeds to 218 where it is determined that the state machine 118 is in queue mode.

Next, at 224, a determination is made as to whether or not a location in the table 116 is available and if so, the process moves on to the step 226 and if not, time is spent waiting for a location to become available in 116. Next, at step 226, the command that is to be sent to the SATA drive or device is moved from the location 114 to the table 116. Next, at step 228, the command is sent to the SATA device and the process goes back to the step 212.

Figure 18:
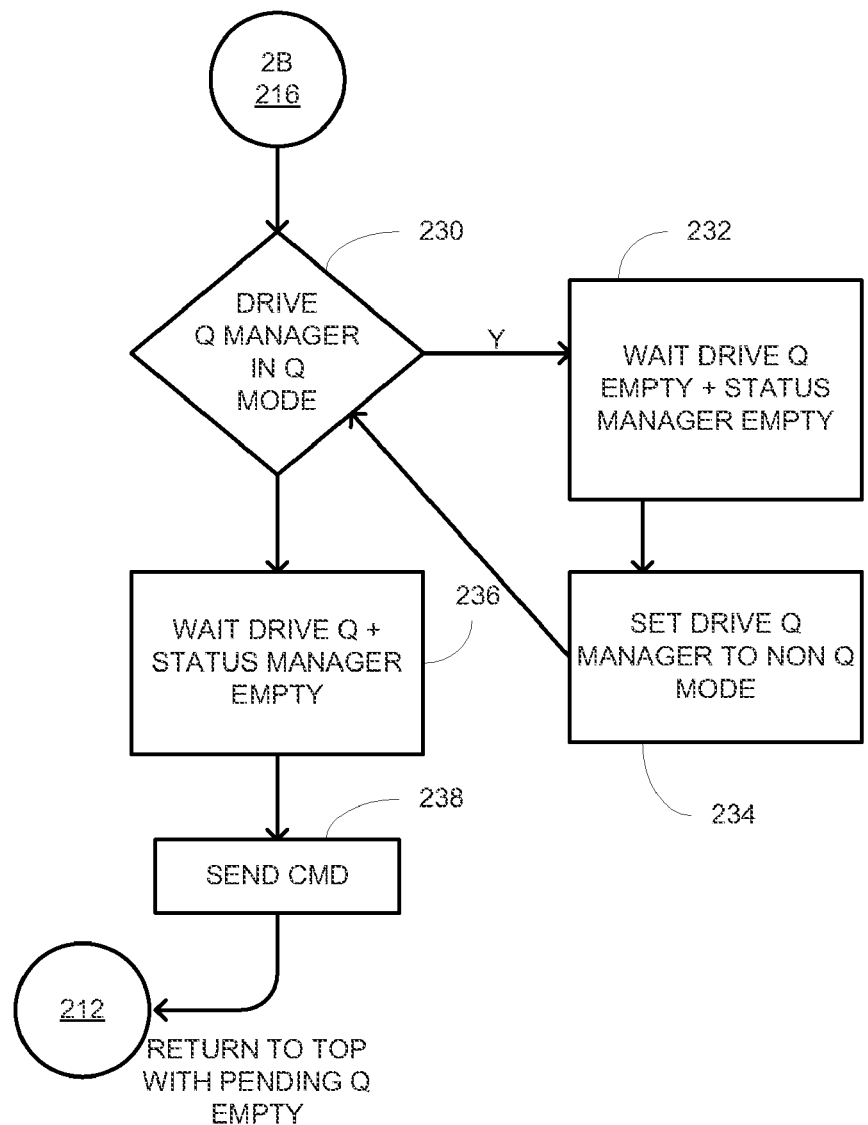
FIG. 18 shows relevant steps performed by the state machine 118, after determining that the received command is not a queued command, at step 214 of FIG. 17.

In FIG. 18, relevant steps performed by the state machine 118, after determining that the received command is not a queued command, at step 214 of FIG. 17, are shown. In FIG. 18, after 216, a determination is made at 230, as to whether or not the state machine 118 is in a queue mode and if so, the process proceeds to the step 232 where time is spent waiting for the table 116 to become empty and when it does, the next step 234 is executed. At step 234, the state machine 118 is set to non-queue mode and the process continues to 230. If at 230, it is determined that the state machine 118 is in queue mode, the step 236 is performed. At step 236, time is passed waiting for the table 116 to empty. Once the table 116 becomes empty, the command is sent to the SATA device and the process returns to step 212 of FIG. 17.

Figure 19:
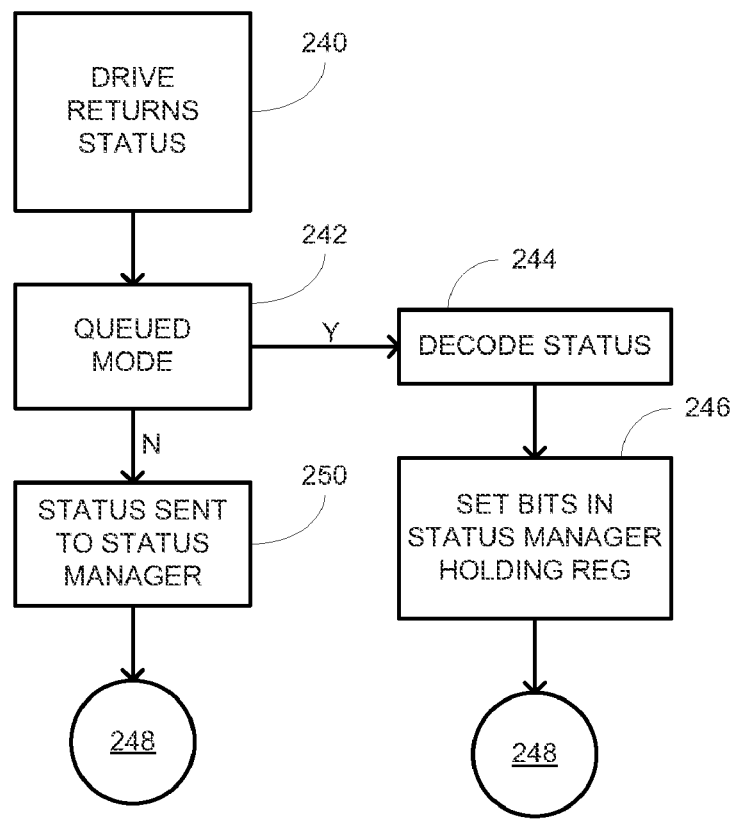
FIGS. 19-21 show relevant steps performed for when the SATA device or drive returns status to a host or initiator.
Figure 20:
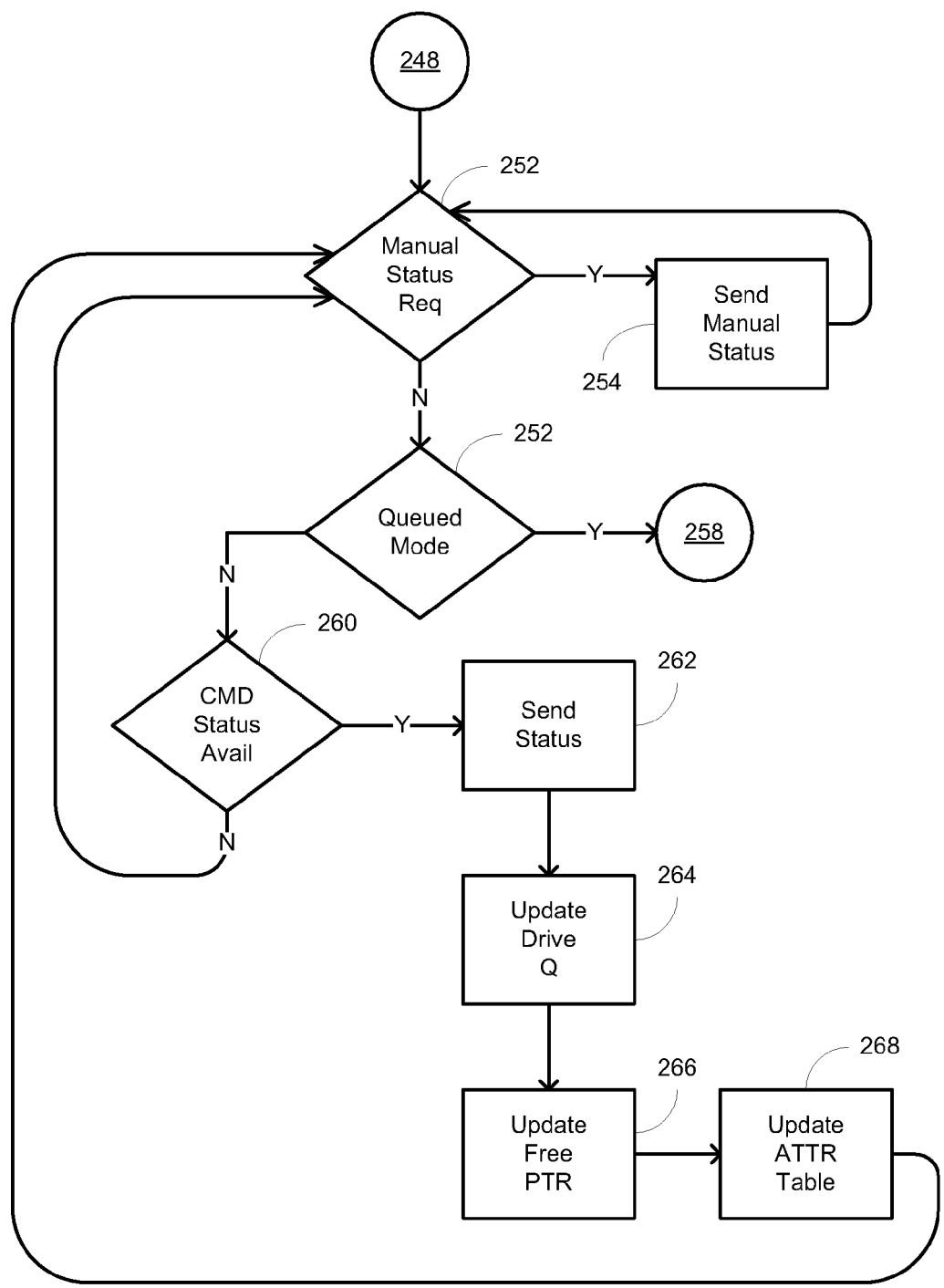
Figure 21:
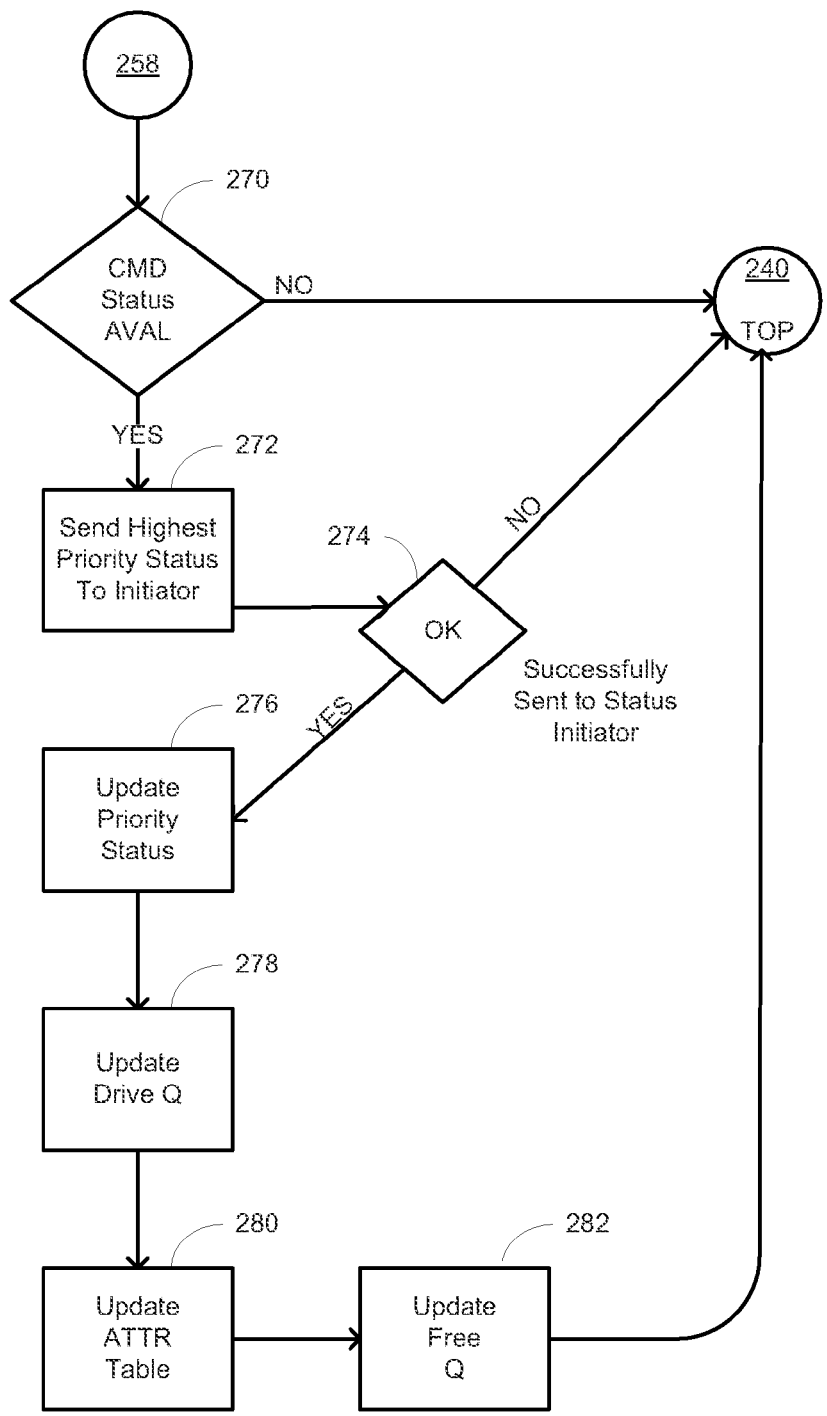

FIGS. 19-21 show relevant steps performed for when the SATA device or drive returns status to a host or initiator. In FIG. 19, at step 240, the SATA device or drive returns or sends back status to the device 80, which is managed by the state machine 119. The state machine 119 determines whether or not the current mode is a queued mode or not. If the mode is queue mode, at step 244, the status is decoded by the state machine 119. Next, at step 246, bits in a holding register of the status managers 120 or 121 are set according to the decoded status in order to relay the status to the host and the process continues to 248.

If at 242, it is determined that the mode is not a queue mode, the process continues to the step 250 wherein the status information received from the SATA device is sent to the status managers 120 or 121 and the process continues to 248.

In FIG. 20, after 248, a determination is made at 252 as to whether or not a manual status request has been made and if so, the process continues to step 254 and the status of the SATA device is sent manually. If the determination at 252 yields that no manual status request has been sent, the process continues to 256 where a determination is made as to queue mode and if it is determined that the current mode is a queue mode, the process continues to 258, however, if no queue mode is detected, the process continues to 260 where another determination is made. At 260, it is determined whether or not command status is available and if so, the process continues to step 262 and if not, the process goes back to 252.

If at 260, it is determined that the command status is available, the command status is sent, at step 262, to a host or initiator. Next, at step 264, the table 116 is updated to reflect the next pending status, if available. Furthermore, at step 266, the table 93 is updated to make the pointers that were used available again. Similarly, at step 268, the table 112 is updated.

After 258, the process continues to 270, in FIG. 21, where a determination is made as to whether or not the command status is available or not, by the CSM 94, and if it is determined that the command status is not available, the process continues to step 240, in FIG. 19, otherwise, the process continues to the step 272. At step 272, the highest priority status is sent to an initiator. At 274, it is determined whether or not the status was successfully sent to the initiator and if so, the process continues to step 276, otherwise, the process continues to step 240.

At step 276, the priority status is updated in light of the previous highest priority status having been sent at step 272. Next, at step 278, the table 116 is updated to reflect the next pending status, if available. Furthermore, at step 280, the table 112 is updated and similarly, at step 282, the table 93 is updated to make the pointers available. After the step 282, the process goes back to the step 240.

The status managers 120 and 121 each also keep track of fairness in servicing requests from initiators in order to effectuate fairness of requests being served. This fairness policy is based on the oldest request from an initiator being served first and further based on the status of an initiator as to whether or not it is busy. The status manager has knowledge of whether or not an initiator is busy by checking the retry timer 171, in FIG. 13. When the initiator is determined to be busy, the SAS engine starts the timer 171 and when the timer 171 expires, the SAS engine clears a status bit that is checked by the status manager for the purpose of determining the availability of the initiator.

The oldest request from an initiator that is not busy is serviced first, followed by the next oldest request from an initiator that is not busy and so on. Once a request from an initiator is serviced, the request is moved to the bottom of a list of requests. Thus, in the case where a table or linked list is used, the request that is located at the top of the table or linked list from an initiator that is not busy is serviced and moved to the bottom of the table or linked list after it has been serviced.

Figure 22:
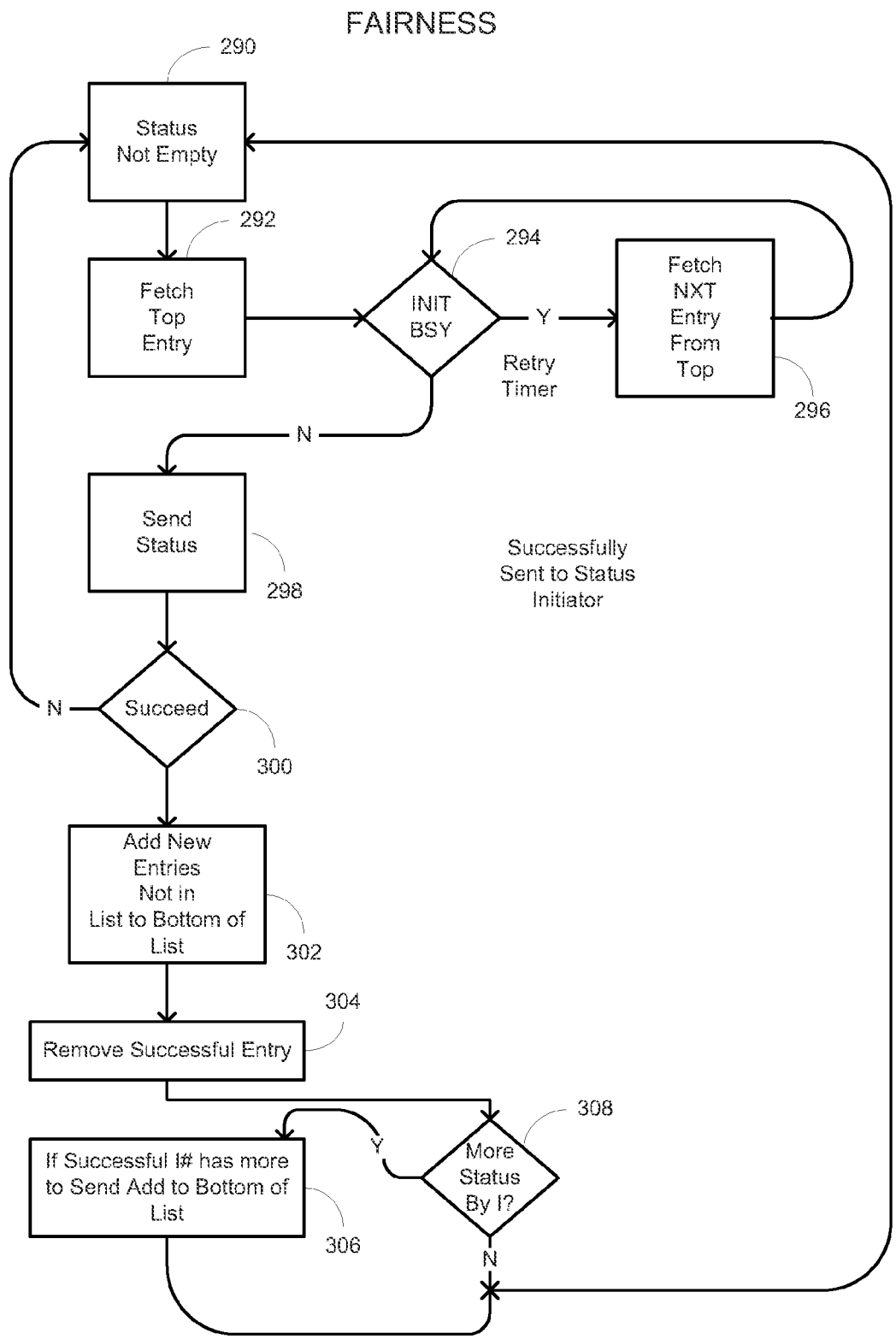
FIG. 22 shows relevant steps performed by the status managers 120 or 121 in enforcing the foregoing fairness policy.

FIG. 22 shows relevant steps performed by the status managers 120 or 121 in enforcing the foregoing fairness policy. At step 290, assuming that there is a pending status and the status is not empty, the next step 292, is to fetch the top entry among the pending requests to the initiator (these requests would be in a table or linked list, in one embodiment of the present invention, as previously discussed) and then at 294, to determine whether or not the initiator whose request was fetched at step 292 is busy and if so, the fetched entry is not processed, rather, the next entry is fetched, at step 296, from the top of the table or linked list of requests and the initiator whose entry was fetched at step 296 is checked for business, at 294. When an initiator is detected to be busy, the retry timer 171 of FIG. 13 is started so as to allow the status manager to know to skip this entry and keep it at the top of the priority list.

If at 294, it is found that the initiator is not busy, status is sent, in response to the fetched entry or request, at step 298, to the initiator. Next, at 300, verification is made as to the success of the sent status and if it is determined that the status was not successfully sent, the process goes back to step 290, otherwise, the process continues to step 302.

At step 302, new entries or requests from initiators that are not in the table of requests are added to the bottom of the table or list. That is, the table is updated to include additional requests but in accordance with the fairness policy, the new requests are added to the bottom of the table.

Next, at 308, if it is determined whether not there is more status of initiator(s) pending and if so, the process continues to step 306, otherwise, the process goes back to step 290. At step 306, if it is determined that there are further entries or requests from the initiator, the additional requests/entries are stored at the bottom of the list or table of entries.

Figure 23:
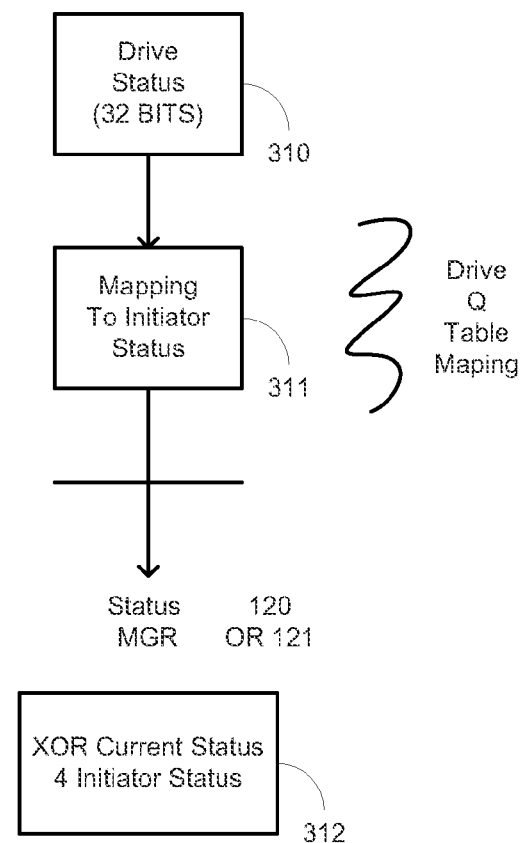
FIG. 23 shows relevant steps for when the SATA device returns status in response to an initiator's request.

FIG. 23 shows relevant steps for when the SATA device returns status in response to an initiator's request. First, at step 310, the status of the SATA device is returned from the DRVM 98. In one embodiment, this is a 32-bit value although it is understood that the value may differ in length as well as format. Next, mapping is performed of the table 116, as discussed above. Next, the current status, which may be coming in or going out, is compared to the stored status within the status managers 120 or 121, by the latter, at step 312. The stored status is located in a holding status register 314.

FIG. 24 shows an exemplary holding status register 314 included within each of the status registers 120 and 121. The register 314 compares status coming into the status manager and similarly compares status going out of the register 314.

Referring now to FIG. 25, a memory system 1000 is shown to include a group of initiators 1200, I0 and I1, coupled to a group of expanders 1400, E0 and E1, with the group of expanders being in communication with the communication system 1600, in accordance with an embodiment of the present invention. It is understood that while two initiators and two expanders are shown, any number of initiators and expanders may be employed. The system 1600 can be considered a 'target'. The expanders E0 and E1 function as switches and typically have many targets connected thereto and/or a hierarchy of expanders. Optionally, no expanders are used, yet optionally, an initiator may be located within an expander. Overall, the topology of the system 1000 is flexibly alterable. I0 is shown coupled to E0 and to E1 and I1 is shown coupled to E1 and to E0 and E0 and E1 are shown coupled to each other.

The system 1000 is shown coupled to the SATA disk drive 1800. The disk drive 1800 is a SATA drive and therefore communicates with the system 1000 using the SATA standard. The system 1000 is shown to include two ports, ports 2000 and 2200, for causing communication with the expanders E0 and E1 using SAS interfaces. The system 1000 uses a third port 2400 to communicate with the drive 1800 using the SATA standard protocols. The drive 1800 is dual-ported having more than one communication paths, which may be active at the same time.

While not shown in FIG. 25, in a practical application, the system 1000 may include many drives, similar to the drive 1800, coupled to expanders. For example, the expander 2600 may be coupled to numerous drives and other than expander 2600, other expanders (not shown) may be employed to further couple other drives to the system. In the foregoing system, there would typically be numerous initiators as well. Some example applications of the system 1000 of FIG. 25, which itself is an example application of the system 10, include but are not limited to document storage and retrieval, photograph storage and retrieval, accounting software storage and retrieval and basically any other application using RAID. Due to the large storage capacity employed, having multiple paths to a device, such as initiator, is highly desirable, as is various information regarding status thereof and errors. This clearly allows for more flexibility, better system performance and lower costs, among other benefits.

The drive 1800 is similar to RAID except that it is dual-ported and it is accessed by the initiators that use the drive for storage of electronic information. Where there is more than one initiator employed, multiple problems arise, such as the initiators all requiring access to the drive, which are resolved by the various embodiments and methods disclosed herein.

FIG. 26 shows a communication system 2500, in accordance with another embodiment of the present invention. The system 2500 is shown to include a group of initiators 2502 coupled to an expander 2504, which is shown to be coupled to a multi-port bridge device 2506, which is shown to be coupled to a storage device 2510. It should be noted that in any of the embodiments herein including the embodiment of FIG. 26, the SATA device may be a SATA drive or any other type of storage unit including but not limited to non-SATA drives. Any number of initiators may be included in the initiators 2502. It should be noted that initiators 2502 and/or expanders as used herein are examples of hosts.

In one embodiment of the present invention, the device 2506 is a multi-port bridge device, such as the types disclosed herein and in another embodiment, the storage device 2510 is a SATA device or a SATA drive.

Further shown in FIG. 26, the device 2506 includes a power control block 2508, which is controlled by an on/off general purpose input/output (GPIO) pin. A pin is any mechanism through which information is transmitted or received. An exploded view of the power control block 2508 is shown at 2512. The power control block is essentially a switch capable of being toggled between supplying power in one state of the switch to not supplying power, in another state of the switch, to the device 2510. The block 2512 is coupled to the device 2510 though a power connection 2514. The power connection 2514, through which power is coupled, causes the device 2510 to receive power or not.

In the embodiment of FIG. 26, power is applied or provided to the device 2510 even when a link 2516, between the device 2506 and the expander 2504 is up or operational. In operation, the expander 2504, through an SMP connection, causes the device 2506 to control power to the device 2510 even when the link 2516 is operational. Additionally, the device 2506 advantageously reports status of power being on or off back to one or more of the initiators of the initiators 2502. Status, in one embodiment of the present invention, is reported back through an SMP connection, although, other ways are anticipated, such as but not limited to through a mailbox or SSP.

The link 2516, in an embodiment of the present invention, is an active link. For a link to be active, the following criteria need exist:

An active link involves two devices where each device has a transmitter and a receiver;

The receiver for both devices need be acquired in synchronization to the received signals such that both devices are able to send dwords to the other device and both devices can properly decode the dword that was sent to it; and The mechanism these two devices are currently using to pass information to each other is the dwords passed on the link.

Once a transmitter is turned on, it will take time for the receiver to be able to lock to (or synchronize with) that signal. There is a delay from when the transmitter is turned on until when the receiver can actually receive the data. It is not unusual for this delay to be 80 uS although some devices may have other times which are smaller or greater than this. Devices that want to communicate when the receiver is not locked typically use squelch or pulses. In this method, the receiver measures the length of time the signal is received or not received to decode the message. Devices using squelch or pulses to communicate do not have active links since, rather than decoding dwords to determine information, they are decoding the length of time a signal is applied or not applied to pass information.

The embodiment of FIG. 26 advantageously allows scalability as there is no requirement for the use of an external device coupled to an expander. Essentially, the same type of the device 2506 may be employed.

FIG. 27 shows a flow chart of the steps performed, by the device 2506, in controlling power, using, for example, the embodiment of FIG. 26. At 2530, a determination is made as to whether or not one of the initiators of the group of initiators 2502 wishes to have the device 2510 power up and if not, there is a wait period at 2530 until an initiator wishes to do so. If an initiator wishes to turn power on, next, at step 2532, an SMP connection is made to the device 2506, by the initiator desiring to turn power on, to do the same. Next, at step 2534, the device 2506 drives the GPIO of the power block 2508 to supply power to the device 2510 by setting the GPIO to an 'on' position. Next, at step 2536, power is provided to the device 2510.

Although the present invention has been described in terms of specific embodiments it is anticipated that alterations and modifications thereof will no doubt become apparent to those skilled in the art. It is therefore intended that the following claims be interpreted as covering all such alterations and modifications as fall within the true spirit and scope of the invention. It is obvious to an expert in the art to combine the present invention with prior art to develop devices and methods that perform multiple functions including the teachings of this invention. Such devices and methods fall within the scope of present invention.

What is claimed is:

1. A communication system for use with at least two hosts and a storage device and configured to conform to one of SATA and/or SAS standards comprising:
    a multi-port bridge device having at least two ports, said multi-port bridge device being in communication with at least two hosts through at least two links, one of the at least two hosts being an active link and coupled to one of the at least two ports through one of the at least two links, another one of the at least two hosts being coupled to another one of the at least two ports through another one of the at least two links, the multi-port bridge device including a command status manager (CSM) responsive to commands and status from the at least two hosts, the CSM including,
    a command issue state machine,
    a command pending table coupled to the command issue state machine and the command processor state machine and being operative to maintain track of commands received from the at least two hosts under the control of the command issue state machine,
    a drive queue table coupled to the command issue state machine and being operative to maintain track of the commands that are destined to be transmitted to a SATA device under the control of the command issue state machine, the command pending table and the drive queue table allowing acceptance of more commands from the at least two hosts than the SATA device is able to handle without concern to the at least two hosts; and
    a data manager (DM) responsive to data from one or more of the at least two hosts for buffering data separately from that of commands and status,
    the multi-port bridge device further including a power control block operative to control power to a storage device through a power connection, the power control block provide power to the storage device even when the at least one of the at least two links is operational.

2. A communication system, as recited in claim 1, wherein the storage device is a SATA device.

3. A communication system, as recited in claim 2, wherein at least one of the at least two links is an active link.

4. A communication system, as recited in claim 3, wherein the multi-port bridge device is operative to report status of power to at least one of the at least two hosts.

5. A communication system, as recited in claim 4, wherein the multi-port bridge device is operative to report status of power to at least one of the at least two hosts through a Serial ATA Tunneled Protocol (STP) connection where the at least two hosts conform to the SATA standard.

6. A communication system, as recited in claim 4, wherein the multi-port bridge device is operative to report status of power to at least one of the at least two hosts through an 'open' connection in conformance with the SAS standard and where the at least two hosts conform to the SAS standard.

7. A communication system, as recited in claim 3, wherein the multi-port bridge device is operative to report status of power to the at least one of the at least two hosts through a mailbox.

8. A communication system, as recited in claim 1, further including a plurality of status managers, each one of the plurality of status managers coupled to transmit status information to a unique host of the at least two hosts, a plurality of incoming buffers, each one of the plurality of incoming buffers responsive to a unique host of the at least two hosts.

9. A communication system configured to conform to SATA standard comprising:
    at least two hosts; and
    a multi-port bridge device having at least two ports, said multi-port bridge device being in communication with the at least two hosts, through at least two links, one of the at least two hosts being an active link and coupled to one of the at least two ports through one of the at least two links, another one of the at least two hosts being coupled to another one of the at least two ports through another one of the at least two links, the multi-port bridge device further in communication with a SATA device, the multi-port bridge device including a command status manager (CSM) responsive to commands and status from the at least two hosts, the CSM including,
    a command issue state machine,
    a command pending table coupled to the command issue state machine and the command processor state machine and being operative to maintain track of commands received from the at least two hosts under the control of the command issue state machine,
    a drive queue table coupled to the command issue state machine and being operative to maintain track of the commands that are destined to be transmitted to a SATA device under the control of the command issue state machine, the command pending table and the drive queue table allowing acceptance of more commands from the at least two hosts than the SATA device is able to handle without concern to the at least two hosts; and
    a data manager (DM) responsive to data from one or more of the at least two hosts for buffering data separately from that of commands and status,
    the multi-port bridge device further including a power control block operative to control power to the SATA device through a power connection, wherein the power control block causes power to be provided to the SATA device even when the at least one link is operational.

10. A communication system, as recited in claim 9, wherein each of the at least two hosts is an initiator.

11. A communication system, as recited in claim 9, wherein the at least two hosts is an expander.

12. A communication system, as recited in claim 9, wherein the multi-port bridge device operative to report status of power to the at least two hosts.

13. A communication system, as recited in claim 12, wherein the multi-port bridge device is operative to report status of power to the at least two hosts through an 'open' connection in conformance with the SAS standard.

14. A communication system, as recited in claim 12, wherein the multi-port bridge device is operative to report status of power to the at least two hosts through a mailbox.

15. A communication system, as recited in claim 9, further including a plurality of status managers, each one of the plurality of status managers coupled to transmit status information to a unique host of the at least two hosts, a plurality of incoming buffers, each one of the plurality of incoming buffers responsive to a unique host of the at least two hosts.

* * * * *